US012668734B2

(12) United States Patent
Yan et al.

(10) Patent No.: US 12,668,734 B2
(45) Date of Patent: Jun. 30, 2026

(54) HYDRATE DECOMPOSITION INHIBITING COMPOSITION, COUPLING ENHANCED SOLID HYDRATE, AND METHOD FOR IMPROVING SOLID HYDRATE STORAGE AND TRANSPORTATION STABILITY

(71) Applicants: CHINA PETROLEUM & CHEMICAL CORPORATION, Beijing (CN); SINOPEC RESEARCH INSTITUTE OF SAFETY ENGINEERING CO., LTD., Qingdao (CN)

(72) Inventors: Kele Yan, Qingdao (CN); Anshan Xiao, Qingdao (CN); Shanjun Mu, Qingdao (CN); Xuyao Hu, Qingdao (CN); Yuemeng Ren, Qingdao (CN); Hongxing Zhang, Qingdao (CN); Yu Lin, Qingdao (CN)

(73) Assignees: CHINA PETROLEUM & CHEMICAL CORPORATION, Beijing (CN); SINOPEC RESEARCH INSTITUTE OF SAFETY ENGINEERING CO., LTD., Qingdao (CN)

( * ) Notice: Subject to any disclaimer, the term of this patent is extended or adjusted under 35 U.S.C. 154(b) by 820 days.

(21) Appl. No.: 18/000,409

(22) PCT Filed: Jan. 26, 2021

(86) PCT No.: PCT/CN2021/073719

§ 371 (c)(1),
(2) Date: Dec. 1, 2022

(87) PCT Pub. No.: WO2021/253832

PCT Pub. Date: Dec. 23, 2021

(65) Prior Publication Data

US 2023/0242805 A1 Aug. 3, 2023

(30) Foreign Application Priority Data

Jun. 18, 2020 (CN) ........................ 202010561401.X
Jun. 18, 2020 (CN) ........................ 202010562076.9
(Continued)

(51) Int. Cl.
*C09K 8/52* (2006.01)

(52) U.S. Cl.
CPC ............ *C09K 8/52* (2013.01); *C09K 2208/10* (2013.01)

(58) Field of Classification Search
CPC .. C09K 8/52; C09K 2208/10; C09K 2208/22; C09K 8/035; C10L 3/108
See application file for complete search history.

(56) References Cited

U.S. PATENT DOCUMENTS

2007/0173417 A1* 7/2007 Kaufman ............... C09K 8/536 507/221
2011/0272160 A1* 11/2011 Arvie, Jr. ............... C09K 8/524 166/311
(Continued)

FOREIGN PATENT DOCUMENTS

CN 106701046 A 5/2017
CN 107987808 A 5/2018
(Continued)

*Primary Examiner* — Alicia Bland
(74) *Attorney, Agent, or Firm* — NKL Law; Allen Xue

(57) ABSTRACT

A hydrate decomposition inhibiting composition, a coupling enhanced solid hydrate, and a method for improving the solid hydrate storage and transportation stability relating to the technical field of natural gas safety storage and transportation are provided. The hydrate decomposition inhibiting composition contains a carboxymethyl starch salt and an alkyl glycoside surfactant. The composition improves the interface stability of the hydrate phase boundary and the mechanical stability of the hydrate and enhance the strength
(Continued)

of the hydrate crystal interface since the colloidal solution formed by dispersing the sodium carboxymethyl starch and the alkyl glycoside surfactant in water can coat the surface of the hydrate to form a protective layer, thereby improving the structural stability of the hydrate. Therefore, the composition inhibits the decomposition of the hydrate, reduces the decomposition rate of the hydrate, and can further reduce the decomposition amount of the hydrate.

19 Claims, 1 Drawing Sheet

(30) Foreign Application Priority Data

Jun. 18, 2020 (CN) ......................... 202010562090.9
Jun. 18, 2020 (CN) ......................... 202010562111.7
Jun. 18, 2020 (CN) ......................... 202010564049.5

(56) References Cited

U.S. PATENT DOCUMENTS

| | | | | |
|---|---|---|---|---|
| 2013/0248191 | A1 | 9/2013 | Nguyen | |
| 2016/0222274 | A1* | 8/2016 | Hoskins | C09K 8/516 |
| 2019/0055484 | A1* | 2/2019 | Bartels | C10G 75/02 |

FOREIGN PATENT DOCUMENTS

| | | | |
|---|---|---|---|
| CN | 108301816 | A | 7/2018 |
| CN | 109321215 | A | 2/2019 |
| CN | 110564472 | A | 12/2019 |
| WO | 2012030181 | A2 | 3/2012 |

* cited by examiner

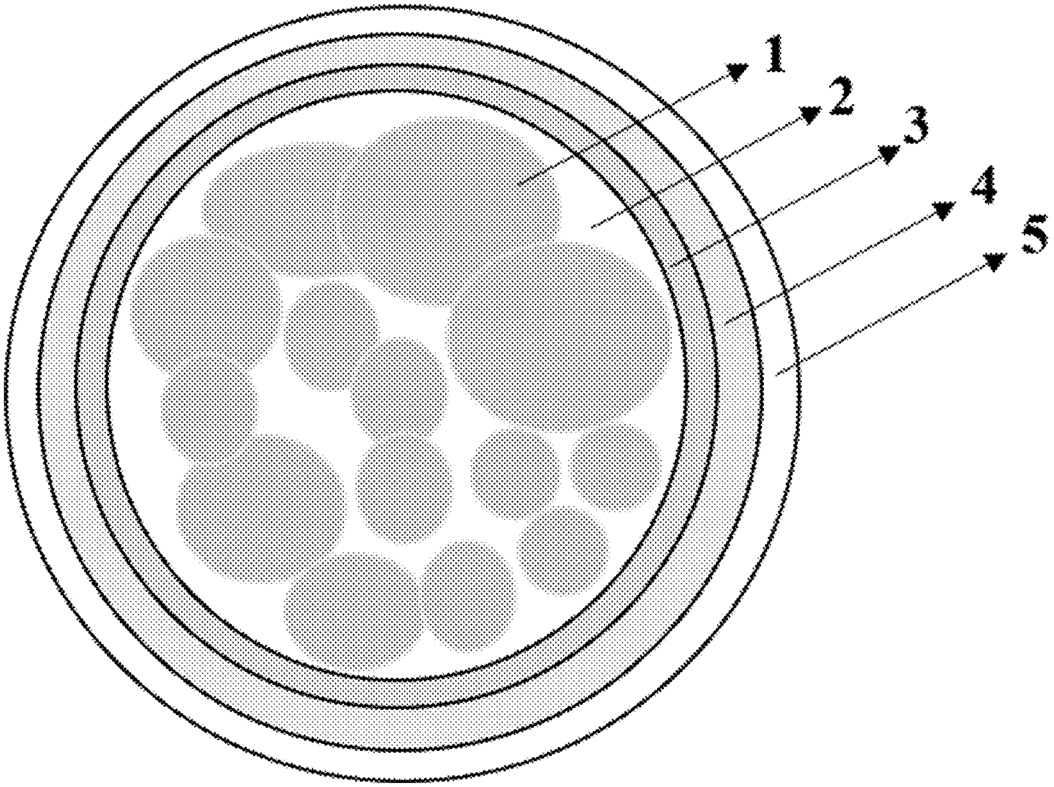
1
2
3
4
5

HYDRATE DECOMPOSITION INHIBITING COMPOSITION, COUPLING ENHANCED SOLID HYDRATE, AND METHOD FOR IMPROVING SOLID HYDRATE STORAGE AND TRANSPORTATION STABILITY

CROSS REFERENCE TO RELATED APPLICATIONS

This application is a U.S. national stage entry of PCT International Application No. PCT/CN2021/073719, filed on Jan. 26, 2021, which claims priority to Chinese Patent Applications with the application numbers 202010561401.X, 202010564049.5, 202010562111.7, 202010562090.9 and 202010562076.9, filed on Jun. 18, 2020, the contents of which is incorporated herein by reference in its entirety.

FIELD

The present disclosure relates to the technical field of natural gas safety storage and transportation, and particularly to a hydrate decomposition inhibiting composition, a coupling enhanced solid hydrate, and a method for improving the solid hydrate storage and transportation stability.

BACKGROUND

The natural gas storage and transportation technologies with a solid hydrate have been widely researched and applied in the industry as the emerging and alternative gas storage technologies due to its advantages, such as relatively high gas storage capacity, non-explosive nature of the storage and transportation process, relative safety and reliability. However, the existing storage and transportation technology uses the self-protection effect of the hydrate to store it at low temperature during the solid hydrate storage and transportation stage, whereas the hydrate in prior art has a high decomposition rate due to structural instability during the storage and transportation process. Under this circumstance, two measures are generally taken to deal with the high decomposition rate: releasing a part of the stored natural gas to ensure storage under an atmospheric pressure, but it will cause waste of the natural gas; or performing the storage and transportation of natural gas by using a pressure-proof storage device, thereby imposing the higher requirements on the storage device and increasing the costs of storage and transportation.

Chinese scholar Jun CHEN discloses a method for inhibiting hydrate decomposition and a hydrate storage and transportation method in CN110564472A having a China patent application number "201910777510.2" and a title of invention "Method for inhibiting hydrate decomposition and hydrate storage and transportation method", and the method comprises the following steps: after a hydrate is formed, covering and adding a hydrate promoter on the surface of the hydrate, wherein the hydrate promoter comprises at least one of tetrahydrofuran and cyclohexane; the method further comprises covering and adding a substance having a low melting point on the surface of the hydrate; the low melting point refers to a melting point between 0-20° C., the substance having a low melting point comprises n-tetradecane, thereby inhibiting subsequent decomposition of the hydrate. It has been proved that the final decomposition percentage of the hydrate after 12-13 h of decomposition is controlled to between 12.4% and 23.9%. As can be seen, the method has a limited inhibitory effect on the hydrate decomposition rate.

CN109321215A having a China patent application number "201811304730.5" and a title of invention "Hydrate decomposition inhibitor suitable for natural gas hydrate formation drilling" discloses a hydrate decomposition inhibitor suitable for natural gas hydrate formation drilling, the hydrate decomposition inhibitor comprises the following raw materials by mass percent: 0 to 100 percent of poly 3-methylene-2-pyrrolidone, 0 to 100 percent of lecithin, and 0 to 100 percent of poly N-vinylpyrrolidone. The method inhibits the decomposition of hydrate by means of feeding the above-mentioned hydrate decomposition inhibitor, and verifies the function of the drilling fluid for inhibiting decomposition of hydrate in the time required for complete decomposition of hydrate, and discovers that 8 h is required for complete decomposition of hydrate without adding the hydrate decomposition inhibitor, and 10.4-18.4 h is required for complete decomposition of hydrate after injecting the hydrate decomposition inhibitor of the invention. Given that the conventional storage and transportation of hydrate is generally more than 18 h, as can be seen, the method has a limited inhibitory effect on the decomposition of hydrate.

Therefore, it is a technical problem shall be urgently solved to further reduce the decomposition rate of the hydrate thereby further decreasing the decomposition amount of the hydrate while maintaining the advantage of a high storage capacity of the solid hydrate, so as to satisfy the requirements of conventional storage and transportation.

SUMMARY

The present disclosure aims to overcome the technical problems in the prior art that the inhibitory effect on the decomposition of solid hydrate is unsatisfactory, and provides a hydrate decomposition inhibiting composition, a coupling enhanced solid hydrate and a method for improving solid hydrate storage and transportation stability.

In order to fulfill the above purpose, an aspect of the present disclosure provides a hydrate decomposition inhibiting composition comprising a starch-based surfactant, wherein the starch-based surfactant comprises a carboxymethyl starch salt and an alkyl glycoside surfactant.

Another aspect of the present disclosure provides a coupling enhanced solid hydrate, wherein the coupling enhanced solid hydrate includes the hydrate decomposition inhibiting composition.

In a further aspect, the present disclosure provides a method for improving solid hydrate storage and transportation stability, wherein the method comprises a hydrate production process, a hydrate storage and transportation process and a gas release process, wherein: (1) the hydrate production process serves to prepare a solid state hydrate core by dispersing a hydrate forming agent in an aqueous phase, contacting a gas with an aqueous system in which the hydrate forming agent is dispersed under the hydrate formation conditions; then adding a dispersion liquid containing a starch-based surface active agent under the hydrate formation conditions to form an hydrate protective layer encapsulating the solid state hydrate core outside the solid state hydrate core to prepare a coupling enhanced solid hydrate; wherein the starch-based surfactant comprises a carboxymethyl starch salt and an alkyl glycoside surfactant; (2) the hydrate storage and transportation process serves to store and transport the coupling enhanced solid hydrate generated by the hydrate production process under the hydrate self-protection conditions; (3) the gas release process serves to decompose the coupling enhanced solid hydrate after the hydrate storage and transportation process under the hydrate decomposition conditions, and release the gas therein.

In the above technical solution, the carboxymethyl starch salt and the alkyl glycoside surfactant contained in the starch-based surfactant in the hydrate decomposition inhibiting composition of the present disclosure, not only improve the interface stability of the hydrate phase boundary, but also improve the mechanical stability of the hydrate and enhance the strength of the hydrate crystal interface since a colloidal solution formed by dispersing the sodium carboxymethyl starch and the alkyl glycoside surfactant in water can coat the surface of the hydrate to form a protective layer, thereby improving the structural stability of the hydrate; therefore, the composition inhibits the decomposition of the hydrate, reduces the decomposition rate of the hydrate, and can further reduce the decomposition amount of the hydrate.

Upon verification, for example in Example 7, after the formation of the solid state hydrated core is completed, adding the hydrate decomposition inhibiting composition comprising the starch-based surfactant of the present disclosure, an hydrate protective layer is formed on the surface of the solid state hydrated core. When the desired hydrate protective layer is completely formed, so as to produce a coupling enhanced solid hydrate comprising the hydrate protective layer. Then, the pressure change in the reaction kettle is recorded in real time at atmospheric pressure during the continuous decomposition for 18.0 h, and it is calculated in accordance with the change of atmospheric pressure relative to the final pressure in the reaction kettle that the decomposition amount of gas is 12.49 mmol and the decomposition rate of hydrate is 13.58% before the gas release process. While in the circumstance of lacking the hydrate protective layer of the present disclosure, for example, in Comparative Example 1, after the formation of the solid hydrated, the pressure change in the reaction kettle is recorded in real time at atmospheric pressure during the continuous decomposition for 18.0 h, and it is calculated in accordance with the change of atmospheric pressure relative to the final pressure in the reaction kettle that the decomposition amount of gas is 25 mmol and the decomposition rate of hydrate is 27.17%.

BRIEF DESCRIPTION OF THE DRAWINGS

The FIGURE illustrates a structurally schematic diagram of a coupling enhanced solid hydrate in a specific embodiment of the present disclosure.

DESCRIPTION OF REFERENCE SIGNS

1. Hydrate crystal
2. Hydrate shell layer
3. Hydrate protective layer
4. Adsorption-absorption protective layer
5. Ice layer

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

One aspect of the present disclosure provides a hydrate decomposition inhibiting composition comprising a starch-based surfactant, wherein the starch-based surfactant comprises a carboxymethyl starch salt and an alkyl glycoside surfactant.

In the above technical solution, the carboxymethyl starch salt and the alkyl glycoside surfactant contained in the starch-based surfactant in the hydrate decomposition inhibiting composition of the present disclosure, not only improve the interface stability of the hydrate phase boundary, but can also improve the mechanical stability of the hydrate and enhance the strength of the hydrate crystal interface since a colloidal solution formed by dispersing the sodium carboxymethyl starch and the alkyl glycoside surfactant in water can coat the surface of the hydrate to form a protective layer, thereby improving the structural stability of the hydrate; therefore, the composition inhibits the decomposition of the hydrate, reduces the decomposition rate of the hydrate, and can further reduce the decomposition amount of the hydrate.

In order to further improve the interface stability of the hydrate phase boundary, enhance the structural stability of the hydrate, thereby inhibiting decomposition of the hydrate and reducing the decomposition rate of hydrate, a mass ratio of the carboxymethyl starch salt and the alkyl glycoside surfactant is 1:1-3; preferably 1:1.5-2.5.

The alkyl glycoside surfactant is a product of carbohydrate compound and fatty alcohol, the general structural formula can be represented by $RO(G)_n$ (as shown in the formula below)

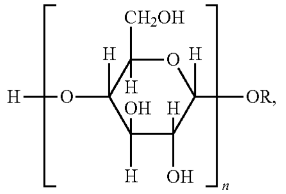

where R represents an alkyl group, typically a $C_8$-$C_{18}$ saturated straight chain alkyl group or branched chain alkyl group; G represents a saccharide unit, n represents the number of saccharide unit, it denotes an alkyl monoglycoside when n=1, and it denotes an alkyl polyglycosides (APG for short) when n≥2, and preferably, n is a positive integer from 1 to 3; and further preferably, the alkyl glycoside surfactant is at least one selected from the group consisting of APG0810, APG0814, APG1214, APG0816 and APG 1216.

According to the present disclosure, the carboxymethyl starch salt may have various options. Preferably, the carboxymethyl starch salt represented by a general structural formula of $[C_6H_7O_2(OH)_2OCH_2COOM]_n$, where M is at least one selected from the group consisting of an alkali metal element, an alkaline earth metal element and an ammonium radical. Wherein, the molecular weight of the carboxymethyl starch salt may be selected in a wide range, preferably, the carboxymethyl starch salt has a weight-average molecular weight of 3,000-150,000 and a substitution degree of carboxymethyl being 0.1-1; and further preferably, the carboxymethyl starch salt is at least one selected from the group consisting of sodium carboxymethyl starch, potassium carboxymethyl starch and ammonium carboxymethyl starch.

Wherein the carboxymethyl starch salt may be a commercially available product, for example, sodium carboxymethyl starch may be a variety of commercially available products, the sodium content may be 2-7 wt %, the degree of substitution (D.S) may be within a range of 0.3-0.6, the viscosity (25° C.) of 2 wt % aqueous solution may be 300-1,200 mPa·s, and a pH of the 1 wt % aqueous solution may be within a range of 6.5-11.5.

In order to further reduce the pressure requirement on the storage and transportation device due to the decomposition of hydrate, or waste of gas caused by the decomposition of hydrate, the hydrate decomposition inhibiting composition further comprises an adsorption-absorption agent that stored independently of the starch-based surfactant, wherein the adsorption-absorption agent is a liquid having a high solubility for gas in the hydrate or a solid capable of adsorbing gas in the hydrate. In this way, even if the hydrate is decomposed, the released gas will be absorbed by the adsorption-absorption agent, thereby reducing the pressure boost amplitude in the system due to the decomposition of the hydrate, so as to maintain storage and transportation safety without a need of releasing the gas; or it does not require a use of the device with a high pressure-bearing capacity, such that the requirement on pressure-bearing capacity of the storage and transportation device is lowered.

Preferably, the adsorption-absorption agent comprises a porous adsorbent material and a multi-carbon straight-chain alkane, the multi-carbon straight-chain alkane has a high solubility for gases in natural gas such as methane, and the porous adsorbent material has a high adsorption capacity, and can be easily dispersed to facilitate absorption and capturing of the released gas. In addition, this kind of the adsorption-absorption agent not only has good solubility and absorbing capacity for gases, especially natural gas, but also can cooperate with a protective layer formed by the carboxymethyl starch salt and the alkyl glycoside surfactant, thereby being attached and covered onto the protective layer containing the carboxymethyl starch salt and the alkyl glycoside surfactant. Here, the carboxymethyl starch salt and the alkyl glycoside surfactant can also play an adhesive role.

A mass ratio of the starch-based surfactant to the adsorption-absorption agent may be adjusted in a wide range; in order to further improve the structural stability of the hydrate, further suppress decomposition of the hydrate and reduce decomposition rate of the hydrate, thereby further reducing the decomposition amount of the hydrate, it is preferable that the mass ratio of the starch-based surfactant to the adsorption-absorption agent is 0.5-10:1, the mass ratio of the starch-based surfactant to the adsorption-absorption agent may be a ratio of the following numerical value relative to 1, for example, 0.5, 1, 1.5, 2, 2.5, 3, 3.5, 4, 4.5, 5, 5.5, 6, 6.5, 7, 7.5, 8, 8.5, 9, 9.5 or 10, or may be any value between 0.5-10. Further preferably, a mass ratio of the porous adsorbent material to the multi-carbon straight-chain alkane is 0.5-10:100; the mass ratio of the porous adsorbent material to the multi-carbon straight-chain alkane may be a ratio of the following numerical value relative to 100, for example, for example, 0.5, 1, 1.5, 2, 2.5, 3, 3.5, 4, 4.5, 5, 5.5, 6, 6.5, 7, 7.5, 8, 8.5, 9, 9.5 or 10, or may be any value between 0.5-10, preferably 1-5:100.

As previously mentioned, the present disclosure can be realized as long as the porous adsorbent material having the desirable adsorption properties for gases is used. Preferably, the porous adsorbent material is a nanoscale material, i.e., porous microparticle having a particle size of 1-100 nm. Further preferably, the porous adsorbent material is at least one selected from the group consisting of expanded graphite, nanographite, carbon nanotubes, graphene, ordered mesoporous molecular sieves and metal organic framework material; further preferably, the multi-carbon straight-chain alkane is selected from straight-chain alkane containing 5-15 carbon atoms; further more preferably, the multi-carbon straight-chain alkane is at least one selected from the group consisting of n-hexane, n-heptane, n-octane, n-nonane, n-decane and n-undecane.

In a preferred embodiment of the present disclosure, in order to further improve the structural stability of the hydrate, further suppress decomposition of the hydrate and reduce the decomposition rate of the hydrate, thereby further reducing the decomposition amount of the hydrate, the hydrate decomposition inhibiting composition further comprises a support material stored independently of the starch-based surfactant; foam pore is distributed in the support material, and the support material has a compressive strength of 1-8 MPa, the foam pore has an average diameter of 50-200 μm, a specific surface area of 500-1,000 $m^2/g$ and a density of 0.05-0.4 $g/cm^3$. The support material has a larger specific surface area and a smaller density. On one hand, a portion of the generated hydrate can be stored in pores on the surface of the support material, improving the stability of the hydrate and promoting formation of the hydrate. On the other hand, under the low temperature self-protection conditions near atmospheric pressure, the support material plays a supporting role, it can reduce the distribution unevenness, thinning or breakage on the surface of the hydrate particles under the force of gravity, thereby further improving the mechanical stability of the hydrate particles, inhibiting decomposition of the hydrate, further reducing the decomposition rate and decomposition amount of the hydrate under low temperature self-protection conditions near atmospheric pressure, reducing the waste of gas and lowering the requirement on the pressure-bearing capacity of the storage and transportation device, and further improving the gas recovery rate of the hydrate. In the present disclosure, the compressive strength of the support material is preferably 1.5-6 MPa, further preferably 2-4 MPa; the foam pore has an average diameter range of 50-200 μm, preferably 100-150 μm; a specific surface area range of 500-1,000 $m^2/g$, preferably 600-900 $m^2/g$; and a density of 0.05-0.4 $g/cm^3$, preferably 0.05-0.3 $g/cm^3$, further preferably 0.1-0.2 $g/cm^3$.

The support material may be selected from various options. Preferably, the support material is at least one selected from the group consisting of foam activated carbon, foamed resin and foamed silicone rubber, and more preferably selected from foamed silicone rubber. The foamed resin refers to a resin having pores distributed on the surface and inside obtained by foaming technique, and may be selected, for example, from polystyrene foam, phenol foamed resin, low density polyethylene foamed resin, linear low density polyethylene foamed resin, polypropylene foamed resin, urea-formaldehyde foamed resin, melamine foamed resin; or may be the composite resin foam therein, such as ethylene/α-olefin copolymer, propylene/α-olefin copolymer, ethylene/propylene/diene/methylene copolymer (EPDMR), polybutadiene and its hydrogenated product, styrene/isoprene/styrene copolymer, styrene/ethylene/butadiene/styrene copolymer, styrene/butadiene copolymer, styrene/ethylene/propylene/styrene copolymer and styrene/butadiene/ styrene copolymer. It is preferable that the foamed resin is selected from the foamed resins having active groups such as amino, carbonyl or hydroxyl groups, such as the melamine foamed resin.

Another aspect of the present disclosure provides a coupling enhanced solid hydrate, wherein the coupling enhanced solid hydrate includes the aforesaid hydrate decomposition inhibiting composition.

In the above-described technical solution, the carboxymethyl starch salt and alkyl glycoside surfactant contained in the starch-based surfactant in the hydrate decomposition inhibiting composition of the present disclosure can improve the structural stability of the hydrate, thereby suppressing decomposition of the hydrate, reducing the decomposition rate of the hydrate, and further reducing the decomposition amount of the hydrate, thereby improving the gas recovery rate of the hydrate.

According to the present disclosure, it is preferred that the coupling enhanced solid hydrate comprises a hydrate forming agent and the aforesaid hydrate decomposition inhibiting composition.

According to the present disclosure, preferably, the coupling enhanced solid hydrate is stored for 18 h under the conditions of a temperature of 268.15K and a pressure of 0-0.5 MPa and the decomposed gas is recovered, wherein the gas recovery rate is not less than 82%; more preferably, the gas recovery rate is not less than 83%; still further preferably, the gas recovery rate is not less than 86%, and still further preferably, the gas recovery rate is not less than 90%.

According to the present disclosure, the gas recovery rate is not less than 82%, meaning that the gas recovery rate can be any value between 82% and 100%, for example, the gas recovery rate may be 82%, 83%, 84%, 85%, 86%, 87%, 88%, 89%, 90%, 91%, 92%, 93%, 94%, 95%, 96%, 97%, 98%, 100%, and any value or any section between 82%-100%.

In accordance with the present disclosure, the gas recovery rate=the amount of gas released by decomposition of the hydrate after 18 h of storage/the amount of gas stored in the hydrate at the beginning of storage×100%.

In accordance with the present disclosure, both the amount of gas stored in the hydrate at the beginning of storage and the amount of gas released by decomposition of the hydrate after 18 h of storage can be calculated by using the Chen-Guo hydrate equilibrium equation, i.e., the decomposition amount of the hydrate at the corresponding moment is converted to the amount of gas in the hydrate at the corresponding moment through a change of the gas pressure in the container. Other methods of calculating the amount of gas known in the art can also be used, the content will not be repeatedly described herein.

According to the present disclosure, the pressure condition of 0-0.5 MPa is maintained by storing the hydrate in a container, maintaining the temperature in the container to be 268.15 K, and maintaining the pressure in the container to 0-0.5 MPa by using a pressure valve, for example, when the pressure in the container approaches 0.5 MPa, the pressure in the container can be maintained at 0-0.5 MPa by means of releasing gas. The pressure herein refers to a gauge pressure.

According to the present disclosure, in the following examples, the gas recovery rate of the coupling enhanced hydrate refers to the percentage of the released amount of the decomposed gas in the coupling enhanced hydrate in the gas release process relative to the aggregate consumption of the gas during the preparation process of hydrate. Since the gas in hydrate may be partially decomposed (for example, a transfer process) prior to the storage of hydrate for 18 h under the conditions consisting of a temperature of 268.15 K and a pressure of 0-0.5 MPa, the amount of gas stored in hydrate at the beginning of the storage for 18 h is less than the aggregate consumption of gas at the time of preparing the hydrate, as a result, the gas recovery rate at the time of gas recovery in the examples of the present disclosure is less than theoretically tested with the above formula, i.e., the amount of gas released from the decomposition of hydrate after 18 h of storage/the amount of gas stored in hydrate at the beginning of storage×100%.

According to the present disclosure, preferably, the hydrate is stored for 18 h under the conditions of a temperature of 268.15 K and a pressure of 0-0.5 MPa with a decomposition rate less than 15%.

The decomposition rate=(gas storage amount in the corresponding hydrate at the beginning of storage for 18 h−gas storage amount in the corresponding hydrate at the time of storage for 18 h)/gas storage amount in the corresponding hydrate at the beginning of storage for 18 h×100%.

Both the gas storage amount in the corresponding hydrate at the beginning of storage for 18 h and the gas storage amount in the corresponding hydrate at the time of storage for 18 h can be determined through the conventional method of measuring the amount of gas stored in the corresponding hydrate, for example, calculated by using the Chen-Guo hydrate equilibrium equation, i.e., the decomposition amount of the hydrate at the corresponding moment is converted to the amount of gas in the hydrate at the corresponding moment through a change of the gas pressure in the container.

In accordance with the present disclosure, it is preferred that the coupling enhanced solid hydrate includes a solid state hydrate core and a hydrate decomposition inhibition shell layer encapsulating the solid state hydrate core; wherein the hydrate decomposition inhibiting shell layer comprises the aforesaid hydrate decomposition inhibiting composition; and the solid hydrate core comprises a hydrate forming agent.

In the above aspect, the coupling enhanced solid hydrate of the present disclosure comprises a solid state hydrate core and a hydrate decomposition inhibiting shell layer encapsulating the solid state hydrate core, the hydrate decomposition inhibiting shell layer comprises the aforesaid hydrate decomposition inhibiting composition. In addition, the carboxymethyl starch salt and the alkyl glycoside surfactant contained in the starch-based surfactant in the hydrate decomposition inhibiting composition, not only improve the interface stability of the hydrate phase boundary, but can also improve the mechanical stability of the hydrate and enhance the strength of the hydrate crystal interface since the colloidal solution formed by dispersing the carboxymethyl starch salt and the alkyl glycoside surfactant in water can coat the surface of the hydrate to form a protective layer, thereby improving the structural stability of the hydrate; therefore, the composition inhibits the decomposition of the hydrate, reduces the decomposition rate of the hydrate, and further reduces the decomposition amount of the hydrate.

According to the present disclosure, there are many options for the specific arrangement modes of the hydrate decomposition inhibiting shell layer; in order to further enhance the structural stability of the hydrate, further suppress decomposition of the hydrate and decrease the decomposition rate of the hydrate, thereby further reducing the decomposition amount of the hydrate, it is preferred that the hydrate decomposition inhibiting shell layer comprises: a hydrate protective layer formed of a starch-based surfactant in the hydrate decomposition inhibiting composition, and optionally an adsorption-absorption protective layer formed of an adsorption-absorption agent, and optionally a support material.

It is further preferred that the hydrate decomposition inhibiting shell layer comprises in sequence from inside to outside: an hydrate protective layer formed of a starch-based surfactant in the hydrate decomposition inhibiting composition, an adsorption-absorption protective layer formed of an adsorption-absorption agent, and a support material. The preferred embodiment can further enhance the structural stability of the hydrate, further suppress decomposition of the hydrate and decrease the decomposition rate of hydrate, thereby further reducing the decomposition amount of the hydrate. In a preferred embodiment of the present disclosure, the hydrate decomposition inhibiting shell layer further comprises an ice layer, which is disposed outside the adsorption-absorption protective layer in place of the support material. In another preferred embodiment of the present disclosure, the hydrate decomposition inhibition shell further comprises an ice layer, which is disposed between the adsorption-absorption protective layer and the support material.

In the above-mentioned technical solution, the hydrate protective layer containing a carboxymethyl starch salt and an alkyl glycoside surfactant can improve the interface stability of the hydrate phase boundary on the one hand, and improve the mechanical stability of the hydrate and enhance the strength of the hydrate crystal interface on the other hand, thereby improving the structural stability of the hydrate, suppressing decomposition of the hydrate, reducing the decomposition rate of the hydrate, and further reducing the decomposition amount of the hydrate. In the case of the hydrate decomposition inhibiting shell layer comprises an adsorption-absorption protective layer formed of an adsorption-absorption agent, even if the hydrate is decomposed, the released gas will be absorbed by the adsorption-absorption agent, thereby reducing the pressure boost amplitude in the system due to the decomposition of the hydrate, so as to maintain storage and transportation safety without a need of releasing the gas; or it does not require an use of the device with a high pressure-bearing capacity, such that the requirement on pressure-bearing capacity of the storage and transportation device is lowered.

In a preferred embodiment of the present disclosure, the solid state hydrate core comprises a hydrate forming agent.

The hydrate forming agent may be a conventional hydrate forming agent in the art, the present disclosure can be implemented by merely contacting the gas with the hydrate promoter in an aqueous system of the hydrate forming agent under the hydrate formation conditions, so as to form a solid state hydrate core. Specifically, the hydrate forming agent may comprise a thermodynamic hydrate forming agent or a kinetic hydrate forming agent. Preferably, the hydrate forming agent comprises a thermodynamic hydrate promoter and/or a kinetic hydrate promoter and an optionally added auxiliary agent.

In order to improve stability of the hydrate and reduce decomposition of the hydrate, the hydrate promotion agent is preferably composed of a thermodynamic hydrate promoter and a kinetic hydrate promoter; further preferably, a mass ratio of the thermodynamic hydrate promoter and the kinetic hydrate promoter is 1:0.1-10. The thermodynamic hydrate promoter may be a conventional thermodynamic hydrate promoter in the art, such as tetrahydrofuran, cyclopentane, tetrabutylammonium bromide, tetrabutylammonium chloride, tetrabutylammonium fluoride, tetrabutylammonium phosphate and tert-butyl peroxybenzoate; in order to improve the stability of the hydrate, the thermodynamic hydrate promoter is preferably at least one selected from the group consisting of tetrahydrofuran, cyclopentane, tetrabutylammonium bromide and tetrabutylammonium chloride. The kinetic hydrate promoter may be a conventional kinetic hydrate promoter in the art, in order to improve stability of the hydrate and reduce decomposition of the hydrate, the kinetic hydrate promoter is preferably selected from the amino acid hydrate promoter, further preferably, at least one selected from the group consisting of leucine, arginine, histidine, glutamic acid, and phenylalanine.

In a preferred embodiment of the present disclosure, it is preferred that the hydrate forming agent is selected from the nanoparticle-containing hydrate promotion composition; the nanoparticle-containing hydrate promotion composition has the advantages of shortening the hydrate formation induction time, increasing the gas solubility, and enhancing the hydrate formation capacity. It is further preferred that the nanoparticle-containing hydrate promotion composition comprises nanoparticle, a surfactant and a stabilizer, the surfactant at least comprises an amino acid amphoteric surfactant and an imidazoline-type surfactant.

According to the present disclosure, the nanoparticle may be various solid particles in conformity with the specific nanometer particle size, provided that they are insoluble in water to ensure the formation of the hydrate, the nanoparticle may be selected from inorganic nanoparticle, preferably selected from nano-oxide, more preferably one or more selected from the group consisting of nano $TiO_2$, nano $SiO_2$, nano MgO, nano $ZrO_2$, nano NiO, nano MnO, nano ZnO and nano $Al_2O_3$; further preferably one or more selected from the group consisting of nano $TiO_2$, nano $SiO_2$, nano ZnO and nano $Al_2O_3$.

Preferably, the nanoparticle has an average particle diameter within a range of 5-500 nm; more preferably, the nanoparticle has an average particle diameter within a range of 10-100 nm.

According to the present disclosure, the surfactant at least comprises an amino acid amphoteric surfactant and an imidazoline-type surfactant, preferably, the surfactant is obtained by mixing the amino acid amphoteric surfactant and the imidazoline-type surfactant.

Both the amino acid amphoteric surfactant and the imidazoline-type surfactant used in the present disclosure are environmentally friendly surfactants, which can reduce environmental pollution; when the amino acid amphoteric surfactant and the imidazoline-type surfactant are mixed, the mixture performs a better surface activation function in solution through the effects of amino group and carboxyl group in the amino acid amphoteric surfactant and cyclic functional group in the imidazoline-type surfactant, thereby effectively reducing the hydrate formation time and increasing the gas storage density.

When the surfactant is obtained by mixing an amino acid amphoteric surfactant with an imidazoline-type surfactant, a mass ratio of the amino acid amphoteric surfactant and the imidazoline-type surfactant may be 1:0.1-10, preferably 1:1-5. The inventors of the present disclosure discover that the hydrate promotion composition obtained with the matching ratio as above has better surface activation effect, and the hydrate promoting effect is more stable.

In the present disclosure, the amino acid amphoteric surfactant refers to an amphoteric surfactant containing an amino group, a carboxyl group and an aliphatic hydrocarbon group having more than 10 carbon atoms, preferably 10-20 carbon atoms in the molecule, preferably 10-15 carbon atoms in the molecule; more specifically, the amino acid amphoteric surfactant may be one or more selected from the group consisting of lauroyl glutamate and N-lauroyl sarcosinate, the salt may be a sodium salt or a potassium salt, the amino acid amphoteric surfactant is preferably sodium lauroyl glutamate.

The imidazoline-type surfactant is mainly prepared by dehydration condensation of a fatty acid or an ester thereof with a polyamine, ring closure, and introduction of a new group; in the present disclosure, the imidazoline-type surfactant is preferably one or more selected from the group consisting of 1-ethyl-3-methylimidazolium acetate and 1-ethyl-3-methylimidazolium triflate, more preferably 1-ethyl-3-methylimidazolium acetate.

In a particularly preferred embodiment of the present disclosure, the surfactant consists of sodium lauroyl glutamate (its structural formula is illustrated in Formula 1) and 1-ethyl-3-methylimidazolium acetate (its structural formula is illustrated in Formula 2).

Formula (1)

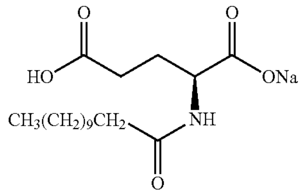

Formula (2)

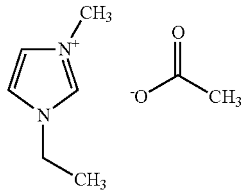

The inventors of the present disclosure have discovered that the preferred surfactant is complexed with one or more of nano $TiO_2$, nano $SiO_2$, nano ZnO and nano $Al_2O_3$, and that the hydrate promotion composition has an excellent promoting effect on the hydration reaction, not only has a short induction time, but also causes a significantly increased gas storage capacity.

According to the present disclosure, the stabilizer serves to disperse the nanoparticle in the solution in a favorable manner and prevent the nanoparticle from sedimentation by agglomeration. An addition of the stabilizer into the hydrate promotion composition may allow that the nanoparticle in the system exist stably and do not prone to coagulate, thereby ensuring stable performance of the hydration promoter composition increasing the gas storage density. The inventors of the present disclosure have discovered when an organic sulfonate salt is selected as a stabilizer, the nanoparticle may be dispersed in the solution more efficiently, thereby ensuring the durability and the quality stability of the hydrate promoter; therefore, sulfonate type stabilizer is preferably selected as a stabilizer of the present disclosure, the reason may be that the sulfate ions in the sulfonate type stabilizer have a strong binding force with the inorganic nanoparticle, and can form a network structure in an aqueous solution, such that the dispersion liquid of the hydrate promotion composition reaches a metastable state, thereby increasing the stability and hydrate formation capacity of the dispersion liquid. The organic sulfonate salt may be a sodium salt or a potassium salt. Specifically, the stabilizer may be one or more selected from the group consisting of sodium 1-naphthalene sulphonate, sodium 2-amino-1-naphthalene sulphonate, sodium lignosulphonate and sodium cellulose sulphonate.

According to the present disclosure, it is preferable that the nanoparticle-containing hydrate promotion composition comprises the nanoparticle in an amount of 5-20 parts by weight, the surfactant in an amount of 1-5 parts by weight, and the stabilizer in an amount of 0.1-1 parts by weight; more preferably, the nanoparticle is contained in an amount of 10-15 parts by weight, the surfactant is contained in an amount of 2-3 parts by weight, and the stabilizer is contained in an amount of 0.5-0.8 parts by weight.

The present disclosure provides a simple process for preparing the aforesaid nanoparticle-containing hydrate promotion composition by uniformly mixing the aforementioned ingredients.

In another preferred embodiment of the present disclosure, the hydrate forming agent is a hydrate promotion composition comprising a composite phase change material; preferably the hydrate promotion composition comprising a composite phase change material comprises a composite phase change material and a hydrate promoter; wherein the composite phase change material comprises a phase change material, a porous matrix and a solid dispersant, the phase change material and the solid dispersant are loaded on the porous matrix.

A Phase Change Material (PCM) refers to a substance that changes its state and provides latent heat without changing its temperature. The process of changing physical properties is called a phase change process, in which the phase change material absorbs or releases a large amount of latent heat. In the present disclosure, the phase change material can not only absorb heat generated during formation of a solid state hydrate core, but also can be coupled with a hydrate promoter to increase the formation rate of the solid state hydrate core, and can also increase the gas storage amount.

In the present disclosure, a phase change material having a phase change temperature (further, a melting point of the phase change material) higher than the generation temperature of the hydrate is suitable for using in the present disclosure. The phase change material may be selected from the group consisting of higher aliphatic alkanes, higher aliphatic alcohols, higher fatty acids, higher fatty acid esters; and further preferably n-alkane and/or diol polymer. Preferably, the n-alkane has a preferred number of 15-25 carbon atoms, for example, at least one selected from the group consisting of n-heptadecane, n-octadecane, n-nonadecane, and n-eicosane.

In order to further promote the formation rate of the solid state hydrate core and increase the gas storage capacity, the phase change material is preferably selected from the group consisting of diol polymer containing alkyl groups of 2-4 carbon atoms; more preferably, at least one selected from the group consisting of polyethylene glycol, polypropylene glycol and polybutylene glycol; further preferably, at least one selected from the group consisting of polyethylene glycol, polypropylene glycol and polybutylene glycol having a weight-average molecular weight of 200-1,000; still further preferably, at least one selected from the group consisting of polyethylene glycol, polypropylene glycol and polybutylene glycol having a weight-average molecular weight of 400-500.

The present disclosure uses a porous material as a porous matrix. The porous material is a material having a network structure consisting of interconnected or closed pores, the boundaries or surfaces of the pores are formed by a pillar or a plate. The porous material can be further divided into a microporous material (with a pore size smaller than 2 nm), a mesoporous material (with a pore size of 2-50 nm) and a macroporous material (with a pore size larger than 50 nm). In order to increase the loading amount of the phase change material, and absorb the phase change material in a porous matrix in the case where the phase change material undergoes an endothermic phase change during the hydrate formation process so that the phase change material does not leak, it is preferable that the porous matrix has a pore size of 1-10 nm, a specific surface area of 100-1,000 $m^2/g$; further preferably a specific surface area of 300-800 $m^2/g$; the porous matrix is preferably at least one selected from the group consisting of expanded graphite, nanographite, carbon nanotubes, graphene, ordered mesoporous molecular sieves and metal organic framework material. Further preferably, the porous matrix has a particle size of 0.1-10 μm, and preferably 0.5-5 μm.

Whereas some liquid dispersants (organic dispersants) increase the phase change material loading on the porous matrix while lowering interfacial tension between the phase change material and the porous matrix, the presence of a liquid dispersant adversely affects the retention of the phase change material in the porous matrix in the event of an endothermic phase change of the phase change material, thereby causing leakage of the phase change material liquid, uneven dispersion of the phase change material, the reaction heat cannot be removed rapidly, thereby adversely affecting the formation of a hydrate. Therefore, in order to lower the interfacial tension between the phase change material and the porous matrix, increase the loading capacity of the phase change material, and adsorb the phase change material on the porous matrix by means of the liquid dispersant and the porous matrix, in the event of an endothermic phase change of the phase change material during formation process of a hydrate, such that the phase change material does not leak, the present disclosure employs a solid dispersant. Preferably, the solid dispersant is at least one selected from the group consisting of attapulgite, bentonite and talc powder. Preferably, the solid dispersant has a particle size of 10-200 μm. Moreover, the preferred solid dispersant has an oxygen-containing functional group within its molecular structure, such that the solid dispersant can be favorably adsorbed on the surface of the porous matrix, thereby increasing the adsorption amount and adhesive strength of the phase change material, thereby enhancing the strength and phase change effect of the composite phase change material.

In a more preferred embodiment of the present disclosure, in order to promote the continuous formation of a solid hydrate and timely absorb the released reaction heat while maintaining the macroscopically solid state of the composite phase change material, it is preferable that the hydrate promotion composition containing the composite phase change material has a mass content of the phase change material being 0.1%-50%; preferably 3%-35%; further preferably 5%-20%, based on the total mass of the composite phase change material; a mass ratio of the phase change material, the porous matrix and the solid dispenser is 1:(1-10):(0.01-0.1); further preferably 1:(3-7):(0.03-0.08).

Still further preferably, the composite phase change material is prepared by a process as follows, the process comprises dissolving and/or dispersing a phase change material in a solvent, and then contacting with a solid dispersant and a porous matrix, supporting the phase change material and the solid dispersant on the porous matrix, and subsequently removing the solvent; preferably, a mass ratio of the solvent to the phase change material is 1:0.01-0.5; more preferably, the contact time is 2-10 h.

In the above technical solution, the solvent for the solution containing the phase change material may have many options, it is not particularly limited in the present disclosure, as long as the phase change material can be dissolved or dispersed. Preferably, the solvent is at least one selected from the group consisting of methanol, ethanol and diethyl ether. Preferably, the technical solution further comprises a step of removing impurities by subjecting the porous matrix to a pre-treatment. The pre-treatment of the porous matrix may be performed with a conventional manner in the art, such as washing with a solvent, drying, and the like. Preferably, the step of pre-treatment for removing impurities is performed in a manner that the porous matrix is subjected to drying at 110-130° C. to remove the impurities inside the porous matrix.

In a preferred embodiment of the present disclosure, a mass ratio of the hydrate promoter to the composite phase change material in the hydrate promotion composition comprising the composite phase change material is 1:(0.1-10); preferably, the mass ratio of the hydrate promoter to the composite phase change material is 1:(0.5-6).

In order to reduce the dispersion filling resistance of an aqueous phase within the composite phase change material, such that the aqueous phase is uniformly dispersed within the pore channels of the porous matrix; so as to further improve the formation rate of the solid state hydrate core and increase the air storage capacity, the solid hydrate promoter further includes an adjuvant; preferably, the reinforcing dispersant is a biosurfactant; a mass ratio of the hydrate promoter to the adjuvant is preferably 1:(0.001-0.01); further preferably, the adjuvant is selected from biosurfactants; more preferably, the adjuvant is selected from rhamnolipid biosurfactants.

Rhamnolipid biosurfactants are biosurfactants which are produced by *Pseudomonas* or *Burkholderia* and provided with basic characteristics of a surfactant, the hydrophilic group is generally composed of one to two molecules of rhamnose ring, and the hydrophobic group is composed of one to two molecules of saturated and unsaturated fatty acids with different carbon chain lengths. Rhamnolipids currently have four main structures, which are generally represented by $R_1$-$R_4$ (shown in Table 1). Rhamnolipid biosurfactants are classified as mono-rhamnolipids and bi-rhamnolipids based on the number of rhamnose rings in the rhamnolipid. More preferably, the rhamnolipid biosurfactants are bi-rhamnolipids.

TABLE 1

| Commonly used four rhamnolipids | |
|---|---|
| 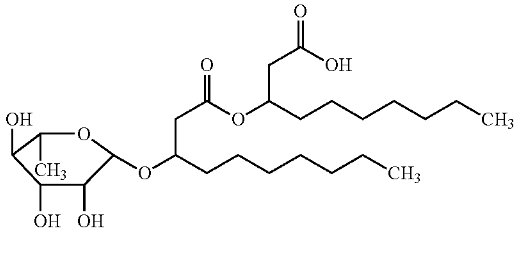 | $R_1$ |

TABLE 1-continued

| Commonly used four rhamnolipids | |
|---|---|
| 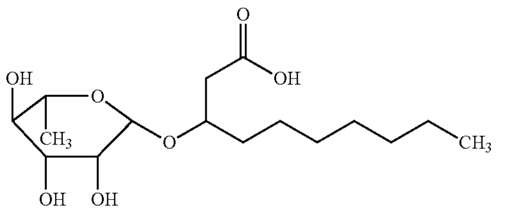 | $R_2$ |
| 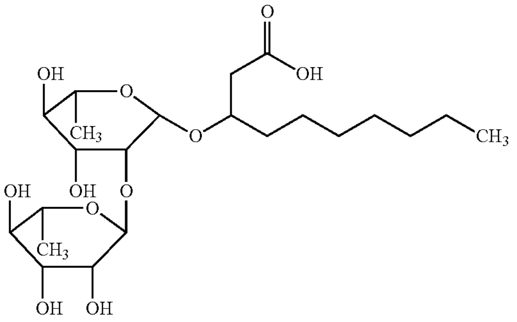 | $R_3$ |
| 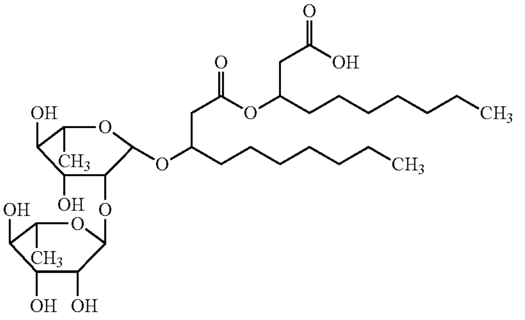 | $R_4$ |

The hydrate promoter in the hydrate promotion composition comprising the composite phase change material is a thermodynamic hydrate promoter and/or a kinetic hydrate promoter; the hydrate promoter is preferably composed of a thermodynamic hydrate promoter and a kinetic hydrate promoter; further preferably, a mass ratio of the thermodynamic hydrate promoter and the kinetic hydrate promoter is (3-4):1; still further preferably, the thermodynamic hydrate promoter is at least one selected from the group consisting of methylcyclopentane, methylcyclohexane, t-butyl methyl ether, tetrabutylammonium bromide and tetrabutylammonium chloride; and yet further preferably, the kinetic hydrate promoter is selected from amino acid kinetic hydrate promoter, preferably at least one selected from the group consisting of leucine, histidine, tryptophan, arginine and glutamic acid.

In a preferred embodiment of the present disclosure, as shown in the FIGURE, the coupling enhanced solid hydrate comprises a solid state hydrate core, and a hydrate protective layer 3, an adsorption-absorption protective layer 4 and an ice layer 5 in sequence encapsulated from inside to outside of the solid state hydrate core with the solid state hydrate core at its center. In comparison with the prior art, the specific embodiment not only comprises a solid state hydrate core with self-protective effect at low temperature, but also adds the hydration protective layer 3, the adsorption-absorption protective layer 4 and the ice layer 5 by coupling through multiple layers, such as specifically coating a surface of the solid state hydrate core with the hydrate protective layer 3, the adsorption-absorption protective layer 4, and the artificially thickened ice layer 5, such that the decomposition of the hydrate is suppressed by means of enhancing structural stability of the hydrate and impeding mass transfer of gas, the decomposition rate of the hydrate is reduced, the self-protective effect of the hydrate is enhanced, thereby strength the stability of the solid hydrate storage and transportation process. Such a mode can lower the pressure-bearing requirement of the hydrate storage and transportation process, which further increases the stability and safety of the gas storage and transportation process.

The solid state hydrate core is as shown in the FIGURE, the solid state hydrate core comprises a hydrate shell 2 and a plurality of hydrate crystals 1 encapsulated in the hydrate shell 2. Wherein the hydrate shell 2 may be a conventional ice layer, or a solid shell layer formed of a porous material or a phase change material, the variations in the structure of the solid state hydrate core itself do not affect the technical effects of the present disclosure.

In yet another aspect, the present disclosure provides a method for improving solid hydrate storage and transportation stability, wherein the method comprises a hydrate production process, a hydrate storage and transportation process and a gas release process; (1) the hydrate production process serves to prepare a solid state hydrate core by dispersing a hydrate forming agent in an aqueous phase, contacting a gas with an aqueous system in which the hydrate forming agent is dispersed under the hydrate formation conditions; then adding a dispersion liquid containing a starch-based surface active agent under the hydrate formation conditions to form an hydrate protective layer encapsulating the solid state hydrate core outside the solid state hydrate core to prepare a coupling enhanced solid hydrate; wherein the starch-based surfactant comprises a carboxymethyl starch salt and an alkyl glycoside surfactant; (2) the hydrate storage and transportation process serves to store and transport the coupling enhanced solid hydrate generated by the hydrate production process under the hydrate self-protection conditions; (3) the gas release process serves to decompose the coupling enhanced solid hydrate after the hydrate storage and transportation process under the hydrate decomposition conditions, and release the gas therein.

As previously mentioned, the carboxymethyl starch salt and the alkyl glycoside surfactant can not only improve the interface stability of the hydrate phase boundary by acting as the surfactants, but also can improve the mechanical stability of the hydrate and enhance the strength of the hydrate crystal interface since the colloidal solution formed by dispersing the carboxymethyl starch salt and the alkyl glycoside surfactant in water can coat the surface of the hydrate to form a protective layer, thereby improving the structural stability of the hydrate; thereby suppressing decomposition of the hydrate, reducing the decomposition rate of the hydrate, and further reducing the decomposition amount of the hydrate.

In accordance with the present disclosure, the coupling enhanced solid hydrate prepared in the present disclosure has a high mechanical stability of the hydrate, a high strength of the hydrate crystal interface, and strong structural stability of the hydrate, thereby inhibiting decomposition of the hydrate during the storage and transportation process, reducing the decomposition rate of the hydrate, and further reducing the decomposition amount of the hydrate. While ensuring the advantage of a solid hydrate having a high air storage capacity, the coupling enhanced solid hydrate can further reducing the decomposition rate of the hydrate, further reducing the decomposition amount of the hydrate, and further lowering the requirements on the gas storage and transportation device.

Preferably, a mass ratio of the carboxymethyl starch salt to the alkyl glycoside surfactant is 1:1-3, more preferably 1:1.5-2.5. In order to facilitate decomposition of the coupling enhanced hydrate prior to use after the storage and transportation of gas is taken in place on the basis of inhibiting decomposition of the coupling enhanced hydrate, it is still further preferred that a mass ratio of the starch-based surfactant to the dispersion liquid is 0.5-10:100, preferably 1-5:100; it is still further preferred that a volume ratio of the dispersion liquid containing the starch-based surfactant to an initial aqueous system forming the solid state hydrate core is not more than 15:100, the volume ratio is preferably 6-12:100.

In the foregoing text, the volume of an initial aqueous system of the solid state hydrate core refers to the volume of an aqueous phase comprising the hydrate promoter prior to generation of a conventional solid hydrate.

According to the present disclosure, it is preferable that the carboxymethyl starch salt is represented by a general structural formula of $[C_6H_7O_2(OH)_2OCH_2COOM]_n$, where M is at least one selected from the group consisting of an alkali metal element, an alkaline earth metal element and an ammonium radical; preferably, the carboxymethyl starch salt has a weight-average molecular weight of 3,000-150,000 and a substitution degree of carboxymethyl being 0.1-1; and further preferably, the carboxymethyl starch salt is at least one selected from the group consisting of sodium carboxymethyl starch, potassium carboxymethyl starch and ammonium carboxymethyl starch.

According to the present disclosure, it is preferred that the alkyl glycoside surfactant is expressed by a general structural formula $RO(G)_n$, where R is a $C_8$-$C_{18}$ straight or branched chain alkyl group, G represents a saccharide unit, n represents the number of saccharide unit, wherein n is a positive integer from 1 to 3.

According to the present disclosure, it is further preferred that the alkyl glycoside surfactant is at least one selected from the group consisting of APG0810, APG0814, APG1214, APG0816 and APG 1216.

In a preferred embodiment of the present disclosure, the method further comprises: after forming the hydrate protective layer, adding an adsorption-absorption agent into the system under the conditions consisting of a temperature within an hydrate self-protective effect temperature range and a system pressure is (0.01-1) MPa, preferably (0.05-1) MPa, more preferably (0.2-1) MPa, higher than a phase equilibrium pressure of the hydrate at the temperature range, so as to form an adsorption-absorption protective layer encapsulating the hydrate protective layer outside the hydrate protective layer. In this way, even if the coupling enhanced hydrate is decomposed, the released gas will be absorbed by the adsorption-absorption agent, thereby reducing the pressure boost amplitude in the system due to the decomposition of coupling enhanced hydrate, so as to maintain storage and transportation safety without a need of releasing the gas; or it does not require an use of the device with a high pressure-bearing capacity, such that the requirement on pressure-bearing capacity of the storage and transportation device is lowered.

Preferably, the adsorption-absorption agent comprises a porous adsorbent material and a multi-carbon straight-chain alkane; further preferably, a mass ratio of the porous adsorbent material and the multi-carbon straight-chain alkane is 0.5-10:100, preferably 1-5:100; preferably, the hydrate self-protective effect temperature range is 253.15K-272.15K; preferably, the hydrate phase equilibrium pressure within the hydrate self-protective effect temperature range is equal to the pressure calculated from the Chen-Guo hydrate phase equilibrium equation.

In order to facilitate decomposition of the coupling enhanced hydrate prior to use after the storage and transportation of gas is taken in place on the basis of inhibiting decomposition of the coupling enhanced hydrate, it is preferred that a volume ratio of the adsorption-absorption agent to the initial aqueous system forming the solid state hydrate core is not more than 15:100; the volume ratio is preferably 5-10:100.

In a preferred embodiment of the present disclosure, the method further comprises after forming the adsorption-absorption protective layer, forming an ice layer encapsulating the adsorption-absorption protective layer outside the adsorption-absorption protective layer, so as to further reduce the diffusive mass transfer rate of gas from the decomposition during the storage and transportation process of the coupling enhanced hydrate and improve the structural stability of hydrate.

Preferably, a volume ratio of water added to form the ice layer relative to the initial aqueous system forming the solid state hydrate core does not exceed 5:100; further preferably, the volume ratio is 2-4:100. Such a volume ratio is conducive to stability of the coupling enhanced hydrate, and can facilitate the decomposition of the coupling enhanced hydrate in the subsequent gas release process.

In a preferred embodiment of the present disclosure, the method further comprises after forming the ice layer, adding a previously mentioned support material into the system. Preferably, a mass ratio of the hydrate forming agent and the support material is 1:(10-500).

In accordance with the present disclosure, a mode of producing the solid state hydrate core comprises: contacting a gas in an aqueous system with the hydrate forming agent under the hydrate formation conditions; wherein the hydrate forming agent may be a conventional hydrate forming agent in the prior art, provided that a solid state hydrate core can be obtained. Preferably, the hydrate forming agent is the previously mentioned hydrate promotion composition containing nanoparticle and/or the hydrate promotion composition containing a composite phase change material.

Preferably, the hydrate formation conditions include a temperature from −20° C. to 50° C., a pressure of 0.1-20 MPa, preferably a temperature from −10° C. to 20° C., a pressure of 1-15 MPa.

In a preferred embodiment of the present disclosure, the method further comprises a step of pre-cooling and/or pressurizing the gas prior to contacting the gas with an aqueous system; preferably, the pre-cooling mode comprises cooling the gas to the hydrate formation temperature prior to contacting the gas with an aqueous system; more preferably, the pressurizing mode comprises pressurizing the gas to the hydrate formation pressure prior to contacting the gas with an aqueous system.

In a preferred embodiment of the present disclosure, the hydrate production process comprises: monitoring a pressure change in the hydrate production system during the formation process of the hydrate, adjusting the temperature and pressure of the hydrate production system from the hydrate production conditions to the hydrate self-protective conditions under an atmospheric pressure when the amplitude of pressure change is not more than 50 kPa/h, and then transferring the coupling enhanced solid hydrate obtained from the hydrate production process to the hydrate storage and transportation process; preferably, recovering the gas free from the coupling enhanced solid hydrate prior to transferring the coupling enhanced solid hydrate to the hydrate storage and transportation process; and further preferably, the temperature of the hydrate self-protective conditions is within a range of 253.15K-270.15K.

In a preferred embodiment of the present disclosure, the hydrate storage and transportation process comprises: monitoring parameters of the system comprising a coupling enhanced solid hydrate during the storage and transportation process, and maintaining the temperature and pressure to be within the target ranges of temperature and pressure during the storage and transportation process by adjusting the temperature of a system comprising the coupling enhanced solid hydrate or releasing gas. Preferably, the temperature of the system comprising a coupling enhanced solid hydrate during the hydrate storage and transportation process is within a range of 243.15-270.15 K, and the pressure is not higher than 0.5 MPa.

According to the present disclosure, in regard to the conditions of gas release process, the conventional conditions or means of recovering gas of the hydrate can be applied, for example, the gas release process decomposes the coupling enhanced solid hydrate by means of increasing the temperature and/or decreasing the pressure to release the gas. Preferably, the temperature of the gas release process is within a range of 273.15-323.15 K, the decreasing pressure and/or increasing the temperature can improve the recovery efficiency of gas in hydrate. For the sake of reducing costs and saving energy consumption, the gas release process is further preferably performed under the room temperature and/or normal pressure. Preferably, the gas release process further comprises defoaming the bubbles generated from the decomposition of a coupling enhanced solid hydrate and/or drying the gas obtained from the decomposition of the coupling enhanced solid hydrate during the decomposition process of the coupling enhanced solid hydrate.

Unless otherwise specified in the present disclosure, the pressure herein refers to a gauge pressure.

As for the water/gas ratio, the conventional ratio in the art may be adopted, and preferably, the filling of an excessive gas is ensured according to the relationship that 1 cubic meter of water stores up to 185 cubic meters of gas during the formation process of the hydrate.

In the above technical solution, the gas may be a single gas of methane, ethane, propane, carbon dioxide, hydrogen or the other gas to be stored and transported, or a mixture of gases, such as associated gas in the natural gas and oil production process, and associated gas in the nature gas production process. The present disclosure also has desirable application prospect in the storage and transportation of acid gas, associated gas in the natural gas and oil production process, and the like.

The type of the reactor is not particularly limited in the present disclosure, it may be, for example, an autoclave; the present disclosure may be accomplished as long as the reactor satisfies the hydrate formation conditions of the present disclosure.

In a specific embodiment of the present disclosure, the solid state hydrate core is obtained through the following steps:

adding the hydrate forming agent into a reactor containing water, setting the reaction temperature and reaction pressure, introducing a gas into the reactor, and contacting the gas with the hydrate forming agent in an aqueous system.

The actual formation amount of hydrate in the system is calculated by using the hydrate thermodynamic equilibrium equation based on the volume of gas consumed by the reaction system, reaction temperature and reaction pressure in the reaction system.

In a specific embodiment of the present disclosure, a method of preparing the coupling enhanced solid hydrate comprises the following steps:

(1-1) preparation of a solid state hydrate core: adding a hydrate forming agent into a reactor containing water, setting the reaction temperature and reaction pressure in the hydrate formation conditions, introducing a gas into the reactor, and contacting the gas with the hydrate forming agent in an aqueous system;

(1-2) after completion of the formation process of the solid state hydrate core in step (1), a certain volume of a dispersion liquid containing a starch-based surfactant is added into the high pressure reaction system, and forming an hydrate protective layer on the surface of the initial solid state hydrate core under the hydrate formation conditions;

(1-3) after lowering the reaction temperature to the hydrate self-protective effect temperature range being below the zero degree, slowly decreasing the reaction pressure to be 0.2-1 MPa above the corresponding hydration phase equilibrium pressure of the temperature; and adding an adsorption-absorption agent into the reaction system, and forming an adsorption-absorption protective layer outside the hydrate protective layer;

(1-4) injecting a certain volume of water into the reaction system when the system temperature is below the freezing point, and further reforming a layer of the ice layer outside the adsorption-absorption protective layer;

(1-5) adding the support material into the system after formation of the ice layer.

The present disclosure addresses the problems in the prior art by using a multi-stage coupling to enhance structural stability of the hydrate, coating the surface of the a solid state hydrate core with a hydrate protective layer, an absorption-adsorption layer, an ice layer and a support material, thereby effectively reducing the decomposition rate of the inner layer hydrate and improving the structural stability of the hydrate.

In a preferred embodiment of the present disclosure, the method for improving solid hydrate storage and transportation stability comprises a hydrate production process, a hydrate storage and transportation process and a gas release process, wherein:

(1) pre-cooling and/or pressurizing the gas by pre-treatment prior to contacting the gas with an aqueous system;

(2) producing a coupling enhanced solid hydrate in accordance with the previously mentioned method;

(3) after formation of the coupling enhanced solid hydrate, monitoring a pressure change in the hydrate production system, adjusting the temperature and pressure of the hydrate production system from the hydrate production conditions to the hydrate self-protective conditions under an atmospheric pressure when the amplitude of pressure change is not more than 20 kPa/h, and then transferring the coupling enhanced solid hydrate obtained from the hydrate production process to the hydrate storage and transportation process;

recovering the gas free from the coupling enhanced solid hydrate prior to transferring the hydrate to the hydrate storage and transportation process, and returning the gas to the pretreatment process;

(4) a hydrate storage and transportation process relates to performing storage and transportation of the coupling enhanced solid hydrate generated by the hydrate formation process under the hydrate self-protection conditions; monitoring parameters of the system comprising a coupling enhanced solid hydrate during the hydrate storage and transportation process, and maintaining the temperature and pressure to be within the target ranges of temperature and pressure during the storage and transportation process by adjusting the temperature of a system comprising the coupling enhanced solid hydrate or releasing gas;

(5) the gas release process relates to decomposition of the coupling enhanced solid hydrate by increasing the temperature and/or decreasing the pressure, and releasing the gas; defoaming the bubbles generated from the decomposition of a coupling enhanced solid hydrate and/or drying the gas obtained from the decomposition of the coupling enhanced solid hydrate.

In the above-mentioned technical solution, the monitoring of pressure and temperature may be performed in a conventional arrangement manner in the art, for example, the pressure monitoring may be performed by using a pressure sensor, the temperature monitoring may be implemented by means of a temperature sensor, the relevant content will not be repeatedly described herein.

In order to evaluate the technical effects of the present disclosure, the experiments and tests were carried out by using an autoclave as follows:

(1) preparation of a coupling enhanced solid hydrate, specific experimental steps were as follows:

(1-1) after washing the entire experimental system, 10 mL of an aqueous system containing a hydrate promoter was prepared proportionally and placed in an autoclave, and the autoclave was initially vacuumized and introduced with an experimental gas to perform replacement for 3 or more times; the system temperature was set to the experimental temperature; after the autoclave temperature reached a preset value and kept stable for 2 h, the autoclave was charged with a certain amount of experimental gas such that the system reached a solubility equilibrium (the pressure of introduced gas was lower than the hydrate equilibrium pressure corresponding to the temperature, the hydrate equilibrium pressure was calculated by using a model of the Chen-Guo hydrate phase equilibrium equation), then the pressurized experimental gas was continuously introduced to the desired pressure for the experiment, an air intake valve was closed, the time recording started and the stirring process was activated; when white hydrate granules were present in the system, the time period from the start of the time recording to the onset of the hydrate particles was recorded as the hydrate induction time; the autoclave temperature was kept constant during the experimental process, and the stirring rate was adjusted to 60 r/min, the experiment was started; the macroscopic changes in the system were observed and shot on-line with a video recorder, the changes of pressure in the autoclave along with the reaction time were recorded by using an automatic data acquisition system; when the pressure in the autoclave was not decreased for continuously 2 h, the default result was that the solid state hydrate core had been completely formed;

(1-2) the autoclave was injected with a dispersion liquid containing a starch-based surfactant prepared in advance and having a certain concentration by using a high-pressure filling device; a hydrate protective layer was formed on the surface of the solid state hydrate core under the conditions of temperature and pressure in step (1); when the pressure in the autoclave was not decreased for continuously 2 h, the default result was that the hydrate protective layer had been entirely formed;

(1-3) after the reaction temperature was reduced below zero degree in the hydrate self-protective effect temperature range (253.15 K-272.15 K), the autoclave pressure was slowly reduced to 0.5 MPa above the hydrate phase equilibrium pressure corresponding to the temperature; an adsorption-absorption agent was injected into the reaction system by using a high-pressure filling device to form an adsorption-absorption protective layer outside the hydrate protective layer;

(1-4) the autoclave was injected with a certain volume of water through the high-pressure filling device, an ice layer with a certain thickness was further formed outside the adsorption-absorption protective layer;

(1-5) a support material was added into the system after the ice layer was formed; such that a coupling enhanced hydrate was obtained;

(1-6) the pressure in the reaction system was then rapidly reduced to an atmospheric pressure, and the vent valve was quickly shut off, the temperature in the autoclave was rapidly decreased to the hydrate self-protection temperature under an atmospheric pressure; the self-protection effect of the hydrate itself was used for maintaining a structural stability of the coupling enhanced hydrate under the atmospheric pressure and low temperature, the excess gas in the autoclave was returned back to the pretreatment unit, such that the autoclave was kept in an atmospheric pressure state;

the autoclave temperature was kept at the hydrate self-protection temperature under an atmospheric pressure, the autoclave was rapidly opened, such that a step of transferring the coupling enhanced hydrate under a low temperature to the hydrate storage and transportation process within 2 min was simulated in the same autoclave;

(2) hydrate storage and transportation process:

after a step of transferring the coupling enhanced hydrate under a low temperature to the hydrate storage and transportation process was simulated, the autoclave was closed, and the course of the simulated hydrate storage and transportation process was initiated: in the meanwhile, the autoclave temperature was set at 268.15 K, the relieving pressure of the safety valve was set at 0.5 MPa, and the autoclave temperature and pressure were monitored by using the temperature/pressure sensor; the gas was automatically released till the system pressure was reduced to less than 0.5 MPa if the pressure of the coupling enhanced hydrate system was greater than 0.5 MPa; so as to simulate a step of transferring the coupling enhanced hydrate to the gas release process after performing the storage and transportation process for 18 h;

(3) gas releasing process: a gas releasing process was simulated in the same autoclave; the gas from decomposition was recovered by means of the temperature rise, the decomposition temperature was set to 293.15K; after the pressure of the system was stabilized and maintained for 2.0 h, the pressure in the autoclave was recorded to calculate the released amount of gas and the gas recovery rate during decomposition of the coupling enhanced hydrate.

The present disclosure also provided a method for evaluating the technical result after applying the for improving solid hydrate storage and transportation stability: firstly the step (1-1) was performed, when the pressure in the autoclave was not decreased for continuously 2 h, the default result was that the solid state hydrate core had been completely formed; wherein the gas consumption due to a decrease of the pressure in the autoclave during the experimental process was equivalent to the gas consumption in the autoclave, it was denoted as the aggregate consumption, i.e., the gas storage capacity of the solid state hydrate core.

The gas consumption was:

$$n_c = n_0 - n_t \quad (1)$$

In Formula (1), $n_c$ denoted the amount of gas consumed (in an unit of mol) required for hydrate formation during a time period from the onset of hydrated particle to the time t, $n_0$ denoted the molar amount of gas in the corresponding system when the experiment proceeded to the induction time, $n_t$ denoted the molar amount of gas in the corresponding system when the experiment proceeded to the time t.

$$n_c = (P_0 Z_0 - P_t Z_t)\frac{V_g}{RT} \quad (2)$$

Formula (1) can also be written as Formula (2) based on the gas state equation, where $P_0$ and $P_t$ denoted the system pressure (in an unit of Pa) when the experiment proceeded to the induction and the time t respectively; $Z_0$ and $Z_t$ denoted the respective gas compression factors for the corresponding states (calculated based on the Peng-Robinson State Equation); $V_g$ denoted the space volume (in an unit of $m^3$) of gas phase in the system; R denoted the molar gas constant (8.314 $J \cdot mol \cdot K^{-1}$); and T denoted the experimental temperature (in an unit of K).

$$V_c = \frac{n_c \times 22.4 \times 1000}{1.25 \times V_l} \quad (3)$$

In Formula (3), $V_c$ denoted the gas storage volume (in an unit of $m^3$) per unit volume of hydrate in the system; and $V_l$ denoted the initial liquid phase volume (in an unit of $m^3$), because the volume expanded by about 1.25 times after the conversion of an aqueous phase to a solid hydrate, thus 1.25 times the initial liquid phase volume was taken as the final hydrate volume in Formula (3).

After 18 h of simulated storage and transportation, the gas from decomposition was recovered by means of increasing temperature in the gas release process, the decomposition temperature was set to 293.15K, the pressure in the autoclave was recorded after the system pressure was stabilized and maintained for 2.0 h, the pressure of the gas in the system at this time was converted to the release amount of decomposed gas of the coupling enhanced hydrate by using the Chen-Guo hydrate phase equilibrium equation, the percentage of the release amount of decomposed gas of the coupling enhanced hydrate relative to the aggregate consumption was used as the gas recovery rate of coupling enhanced hydrate, thereby implementing the method for evaluating the hydrate storage stability.

The decomposition rate was the difference between 100% and the gas recovery rate, i.e., the percentage of the decomposition amount of the gas to the aggregate consumption of the gas prior to the gas release process.

Chen-Guo hydrate phase equilibrium model was a well-known computational equation in the technical field, for example, the Chen-Guo hydrate phase equilibrium equation model described in the published journal article on the foreign language periodicals, namely Chen G. J., Guo T. M. A new approach to gas hydrate modelling. *Chem. Eng.* 1, 1998, 71(2): 145-151.

Test of induction time: during the preparation of a solid state hydrate core, the intake valve was closed when the pressure and temperature in the system reached the target pressure and temperature of hydrate formation, the time recording started, when white hydrate granules were present in the system, the experiment was continuously performed for 30 min and the pressure at this time was recorded. The present disclosure compared the performance of a hydrate promoter based on the hydrate induction time in different systems and the pressures reached after the continuous formation of the hydrate for 30 min. The shorter was the hydrate induction time, the better was the promoting effect of the hydrate promoter; and vice versa. In the case where the starting experiment pressures were the same, the smaller was the pressure reached after the continuous formation of the hydrate for 30 min, it demonstrated that the larger was the amount of gas involved in the hydrate formation, the higher was the gas storage density of the hydrate, the better was the effect of the hydrate promoter; and vice versa.

The experimental gas used in all the Comparative Examples and the Examples described below was methane gas with a purity of 99.99%.

The present disclosure was described in detail below with reference to examples. In the following examples, graphene and carbon nanotubes were available from Nanjing Xianfeng Nano Material Technology Co., Ltd.; sodium carboxymethyl starch was purchased from Shanghai Aladdin Biochemical Technology Co., Ltd.; and alkyl glycoside surfactant was purchased from Shijiazhuang Jinmoer Chemical Co., Ltd., wherein the detailed information of different carbon chain length models were specified in Table 1.

TABLE 1

| Items | APG0814 | APG1214 | APG1216 |
|---|---|---|---|
| Appearance | yellowish viscous liquid | yellowish viscous liquid | yellowish viscous liquid |
| Solid content/% | 50 | 50 | 50 |
| pH (10% aqueous solution) | 11.5-12.5 | 11.5-12.5 | 11.5-12.5 |
| Free alcohol content/% | ≤1.0 | ≤1.0 | ≤1.0 |
| Inorganic salt content/% | ≤4.0 | ≤4.0 | <4.0 |
| Low carbon glycoside content/% | ≤0.5 | ≤0.5 | ≤0.5 |
| Average degree of polymerization | 1.2-1.8 | 1.2-1.8 | 1.2-1.8 |
| Viscosity (20° C.)/mPa · s | ≥1000 | ≥3000 | ≥3000 |
| Cloud point/° C. | >100 | >100 | >100 |
| HLB value | 13-15 | 12-14 | 10-12 |
| Density | 1.05-1.15 | 1.05-1.15 | 1.05-1.15 |

Example 1

An initial aqueous system of a solid state hydrate core: a hydrate promoter in use was prepared by mixing tetrahydrofuran (THF) and histidine according to a mass ratio of 1:1, and 10 mL aqueous system was formed according to a mass ratio 1:100 of the hydrate promoter and water.

A dispersion liquid comprising a starch-based surfactant: the starch-based surfactant was prepared by mixing sodium carboxymethyl starch and alkyl polyglycoside APG1214 in a mass ratio of 1:2; and 1 mL of the dispersion liquid comprising the starch-based surfactant was obtained by dispersing the starch-based surfactant in water according to a mass ratio of 1:100.

An adsorption-absorption agent: 1 mL of the adsorption-absorption agent was formulated based on graphene and n-undecane in a mass ratio of 2:100.

A volume of pure water for producing an ice layer was 0.5 mL.

(1) Preparation of a coupling enhanced solid hydrate, concrete experimental steps were as follows:

(1-1) formation of a solid state hydrate core, initial experimental temperature and experimental pressure were 276.15K and 7.0 MPa, respectively; the autoclave temperature was kept constant during the experimental process, when the pressure in the autoclave was not decreased for continuously 2 h, the default result was that the hydrate core had been completely formed;

the hydrate induction time was 4.2 min, the system pressure starting from the onset of the hydrate granules of the system to 30 min after the reaction was carried out was 4,455 kPa;

the gas consumption in the autoclave during the experiment was 92 mmol, i.e. the amount of gas stored in the solid state hydrate core;

(1-2) the autoclave was injected with a dispersion liquid prepared in advance containing a starch-based surfactant by using a high-pressure filling device; a hydrate protective layer was formed on the surface of the solid state hydrate core under the condition of a temperature 276.15K for formation of the solid state hydrate core; when the pressure in the autoclave was not decreased for continuously 2 h, the default result was that the hydrate protective layer had been entirely formed;

(1-3) after the reaction temperature was reduced below zero degree in the hydrate self-protective effect temperature range 268.15K, the pressure in the autoclave was slowly reduced to slightly (0.85 MPa) above the hydrate phase equilibrium pressure corresponding to the temperature; an adsorption-absorption agent prepared in advance was injected into the reaction system by using the high-pressure filling device to form an adsorption-absorption protective layer outside the hydrate protective layer;

(1-4) the autoclave was injected with pure water through the high-pressure filling device, an ice layer was further formed outside the adsorption-absorption protective layer, such that a coupling enhanced solid hydrate was obtained;

the pressure in the reaction system was then rapidly reduced to an atmospheric pressure, and the vent valve was quickly shut off, the temperature in the autoclave was rapidly decreased to 268.15 K; the self-protection effect of the hydrate itself was used for maintaining a structural stability of the hydrate under the atmospheric pressure and low temperature, the excess gas in the autoclave was returned back to the pretreatment unit, such that the autoclave was kept in an atmospheric pressure state;

the autoclave temperature was kept at 268.15 K, the autoclave was rapidly opened, such that a step of transferring the coupling enhanced hydrate under a low temperature to the hydrate storage and transportation process within 2 min was simulated in the same autoclave.

(2) Hydrate storage and transportation process:

after a step of transferring the coupling enhanced hydrate under a low temperature to the hydrate storage and transportation process was simulated, the autoclave was closed, and the course of the simulated hydrate storage and transportation process was initiated: in the meanwhile, the autoclave temperature was set at 268.15 K, the relieving pressure of the safety valve was set at 0.5 MPa, and the autoclave temperature and pressure were monitored by using temperature/pressure sensor; the gas was automatically released till the system pressure was reduced to less than 0.5 MPa if the pressure of the coupling enhanced hydrate system was greater than 0.5 MPa; so as to simulate a step of transferring the coupling enhanced hydrate to the gas release process after performing the storage and transportation process for 18 h.

(3) Gas releasing process: a gas releasing process was simulated in the same autoclave; the gas from decomposition was recovered by means of the temperature rise, the decomposition temperature was set to 293.15K; after the pressure of the system was stabilized and maintained for 2.0 h, the pressure in the autoclave was recorded to calculate the released amount of gas and the gas recovery rate during decomposition of the coupling enhanced hydrate. The gas recovery rate after decomposition of the coupling enhanced hydrate was 93.48%, and the decomposition rate of the coupling enhanced hydrate during the storage and transportation process before the gas release process was 6.52%.

Example 2

An initial aqueous system of a solid state hydrate core: a hydrate promoter in use was prepared by mixing tetrahydrofuran and histidine according to a mass ratio of 1:1, and 10 mL aqueous system was formed according to a mass ratio 3:100 of the hydrate promoter and water.

A dispersion liquid comprising a starch-based surfactant was the same as in Example 1.

A absorption-absorbent agent was the same as in Example 1.

A volume of pure water for producing the ice layer was 0.4 mL.

Specific experimental steps were the same as in Example 1, wherein the gas consumption in the autoclave during the experimental process of formation of a solid state hydrate core in step (1-1) was 96 mmol.

The pressure changes in the autoclave were recorded in real time over 18.0 h of the continuous decomposition process, and the decomposition amount of the gas before the gas release process was 5.2 mmol according to the changes in pressure from an atmospheric pressure to the last pressure in the autoclave, the gas recovery rate was 94.53%, and the decomposition rate of hydrate was only 5.47%.

Example 3

An initial aqueous system of a solid state hydrate core: a hydrate promoter in use was prepared by mixing tetrahydrofuran and leucine according to a mass ratio of 1:1, and 10 mL aqueous system was formed according to a mass ratio 2:100 of the hydrate promoter and water.

A dispersion liquid comprising a starch-based surfactant: the starch-based surfactant was prepared by mixing sodium carboxymethyl starch and alkyl polyglycoside APG0814 in a mass ratio of 1:2; and 1 mL of the dispersion liquid comprising the starch-based surfactant was obtained by dispersing the starch-based surfactant in water according to a mass ratio of 1:100.

An adsorption-absorption agent: 1 mL of the adsorption-absorption agent was formulated based on carbon nanotubes and n-undecane in a mass ratio of 2:100.

A volume of pure water for producing an ice layer was 0.5 mL.

Specific experimental steps were the same as in Example 1, wherein the gas consumption in the autoclave during the experimental process of formation of a solid state hydrate core in step (1-1) was 93 mmol.

The pressure changes in the autoclave were recorded in real time over 18.0 h of the continuous decomposition process, and the decomposition amount of the gas before the gas release process was 8 mmol according to the changes in pressure from an atmospheric pressure to the last pressure in the autoclave, the gas recovery rate was 91.39%, and the decomposition rate of hydrate was 8.61%.

Example 4

An initial aqueous system of a solid state hydrate core: a hydrate promoter in use was prepared by mixing tetrahydrofuran (THF) and leucine according to a mass ratio of 1:1, and 10 mL aqueous system was formed according to a mass ratio 4:100 of the hydrate promoter and water.

A dispersion liquid comprising a starch-based surfactant: the starch-based surfactant was prepared by mixing sodium carboxymethyl starch and alkyl polyglycoside APG1214 in a mass ratio of 1:2; and 1 mL of the dispersion liquid comprising the starch-based surfactant was obtained by dispersing the starch-based surfactant in water according to a mass ratio of 1:100.

An adsorption-absorption agent: 1 mL of the adsorption-absorption agent was formulated based on carbon nanotubes and n-undecane in a mass ratio of 2:100.

A volume of pure water for producing an ice layer was 0.5 mL.

Specific experimental steps were the same as in Example 1, wherein the gas consumption in the autoclave during the experimental process of formation of a solid state hydrate core in step (1-1) was 96 mmol.

The pressure changes in the autoclave were recorded in real time over 18.0 h of the continuous decomposition process, and the decomposition amount of the gas before the gas release process was 4.8 mmol according to the changes in pressure from an atmospheric pressure to the last pressure in the autoclave, the gas recovery rate was 95.0%, and the decomposition rate of hydrate was 5.0%.

Example 5

An initial aqueous system of a solid state hydrate core: a hydrate promoter in use was prepared by mixing tetrabutylammonium bromide and leucine according to a mass ratio of 1:1, and 10 mL aqueous system was formed according to a mass ratio 4:100 of the hydrate promoter and water.

A dispersion liquid comprising a starch-based surfactant: the starch-based surfactant was prepared by mixing sodium carboxymethyl starch and alkyl polyglycoside APG1214 in a mass ratio of 1:2; and 1 mL of the dispersion liquid comprising the starch-based surfactant was obtained by dispersing the starch-based surfactant in water according to a mass ratio of 1:100.

An adsorption-absorption agent: 1 mL of the adsorption-absorption agent was formulated based on carbon nanotubes and decane in a mass ratio of 2:100.

A volume of pure water for producing an ice layer was 0.5 mL.

Specific experimental steps were the same as in Example 1, wherein the gas consumption in the autoclave during the experimental process of formation of a solid state hydrate core in step (1-1) was 91 mmol.

The pressure changes in the autoclave were recorded in real time over 18.0 h of the continuous decomposition process, and the decomposition amount of the gas before the gas release process was 6.2 mmol according to the changes in pressure from an atmospheric pressure to the last pressure in the autoclave, the gas recovery rate was 93.19%, and the decomposition rate of hydrate was 6.81%.

Example 6

An initial aqueous system of a solid state hydrate core: a hydrate promoter in use was prepared by mixing tetrabutylammonium bromide and leucine according to a mass ratio of 1:1, and 10 mL aqueous system was formed according to a mass ratio 3:100 of the hydrate promoter and water.

A dispersion liquid comprising a starch-based surfactant: the starch-based surfactant was prepared by mixing sodium carboxymethyl starch and alkyl polyglycoside APG1214 in a mass ratio of 1:2; and 1 mL of the dispersion liquid comprising the starch-based surfactant was obtained by dispersing the starch-based surfactant in water according to a mass ratio of 1:100.

An adsorption-absorption agent: 1 mL of the adsorption-absorption agent was formulated based on carbon nanotubes and decane in a mass ratio of 2:100.

A volume of pure water for producing an ice layer was 0.5 mL.

Specific experimental steps were the same as in Example 1, wherein the gas consumption in the autoclave during the experimental process of formation of a solid state hydrate core in step (1-1) was 89 mmol.

The pressure changes in the autoclave were recorded in real time over 18.0 h of the continuous decomposition process, and the decomposition amount of the gas before the gas release process was 5.2 mmol according to the changes in pressure from an atmospheric pressure to the last pressure in the autoclave, the gas recovery rate was 94.16%, and the decomposition rate of hydrate was 5.84%.

Example 7

A coupling enhanced solid hydrate was prepared by using a initial aqueous system for forming a solid state hydrate core and a dispersion liquid comprising a starch-based surfactant in Example 1, except that steps (1-1) and (1-2) were carried out only, steps (1-3) and (1-4) were not performed.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 12.49 mmol according to the changes in pressure from an atmospheric pressure to the last pressure in the autoclave, the gas recovery rate was 86.42%, and the decomposition rate of hydrate was 13.58%.

Example 8

A coupling enhanced solid hydrate was prepared by using a method described in Example 7, except that alkyl polyglycoside APG1214 in Example 7 was replaced with alkyl polyglycoside APG1216.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 14.55 mmol according to the changes in pressure from an atmospheric pressure to the last pressure in the autoclave, the gas recovery rate was 84.19%, and the decomposition rate of hydrate was 15.81%.

Example 9

A coupling enhanced solid hydrate was prepared by using a formulation and method described in Example 7, except that the starch-containing based surfactant was prepared by mixing sodium carboxymethyl starch and alkyl polyglycoside APG1214 in a mass ratio of 1:0.3.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 15.05 mmol according to the changes in pressure from an atmospheric pressure to the last pressure in the autoclave, the gas recovery rate was 83.65%, and the decomposition rate of hydrate was 16.35%.

Example 10

A coupling enhanced solid hydrate was prepared by using a formulation and method described in Example 7, except that the starch-containing based surfactant was prepared by mixing sodium carboxymethyl starch and alkyl polyglycoside APG1214 in a mass ratio of 1:4.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 14.06 mmol according to the changes in pressure from an atmospheric pressure to the last pressure in the autoclave, the gas recovery rate was 84.72%, and the decomposition rate of hydrate was 15.28%.

Example 11

A hydrate was prepared by using an initial aqueous system for forming a solid state hydrate core, a dispersion liquid comprising a starch-based surfactant, and an adsorption-absorption agent in Example 1, except that steps (1-1), (1-2), and (1-3) were carried out only, and step (1-4) was not performed.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 10.33 mmol according to the changes in pressure from an atmospheric pressure to the last pressure in the autoclave, the gas recovery rate was 88.77%, and the decomposition rate of hydrate was 11.23%.

Example 12

A coupling enhanced solid hydrate was prepared by using a formulation and method described in Example 11, except that a mass ratio of graphene to n-undecane in the adsorption-absorption agent was 12:100.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 10.89 mmol according to the changes in pressure from an atmospheric pressure to the last pressure in the autoclave, the gas recovery rate was 88.16%, and the decomposition rate of hydrate was 11.84%.

Example 13

A coupling enhanced solid hydrate was prepared by using a formulation and method described in Example 11, except that a mass ratio of graphene to n-undecane in the adsorption-absorption agent was 0.3:100.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 11.12 mmol according to the changes in pressure from an atmospheric pressure to the last pressure in the autoclave, the gas recovery rate was 87.91%, and the decomposition rate of hydrate was 12.09%.

Example 14

A coupling enhanced solid hydrate was prepared by using a formulation and method described in Example 1, except that the water in step (1-4) was added in an amount of 1 mL.

The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 9.81 mmol according to the changes in pressure from an atmospheric pressure to the last pressure in the autoclave, the gas recovery rate was 89.33%, and the decomposition rate of hydrate was 10.67%.

Example 15

A coupling enhanced solid hydrate was prepared according to a method in Example 1, except that a dispersion liquid of a hydrate promotion composition was used for replacing the hydrate promoter prepared by mixing tetrahydrofuran and histidine according to a mass ratio of 1:1 in Example 1.

The dispersion liquid of the hydrate promotion composition in the Example was obtained by using the following method:

S1: 10 parts by weight of nano $SiO_2$ particle having a particle diameter of 10-50 nm and 0.6 parts by weight of sodium 1-naphthalene sulfonate were put into 100 parts by weight of water and stirred at a stirring speed of 700 r/min for a stirring time of 30 min;

S2: 2.5 parts by weight of a surfactant (sodium lauroyl glutamate and 1-ethyl-3-methylimidazolium acetate in a mass ratio of 1:3) was added into the mixture obtained in S1 and stirred at a stirring speed of 500 r/min for a stirring time of 20 min, such that the dispersion liquid of the hydrate promotion composition was prepared.

Upon testing, the hydrate induction time was 2.2 min during the preparation of the hydrated core. The system pressure starting from the onset of the hydrate granules of the system to 30 min after the reaction was carried out was 4,285 kPa.

The gas recovery rate was 94.48%; the decomposition rate of hydrate was 5.52%.

Example 16

A coupling enhanced solid hydrate was prepared according to a method in Example 7, except that a dispersion liquid of a hydrate promotion composition was used for replacing the hydrate promoter prepared by mixing tetrahydrofuran and histidine according to a mass ratio of 1:1 in Example 1.

The dispersion liquid of the hydrate promotion composition in the Example was the same as that in Example 15.

Upon testing, the hydrate induction time was 2.2 min during the preparation of the hydrated core. The system pressure starting from the onset of the hydrate granules of the system to 30 min after the reaction was carried out was 4,285 kPa.

After 18.0 h, the gas recovery rate was 88.35%; the decomposition rate of hydrate was 11.65%.

Example 17

A coupling enhanced solid hydrate was prepared according to a method in Example 1, except that a solid state hydrate core was prepared by following process, the subsequent steps were the same as those in Example 1.

A solid state hydrate promoter was prepared by blending a hydrate promoter, a composite phase change material, and rhamnolipid in a mass ratio of 1:1:0.005.

The formulation of the composite phase change material was blending the PEG400 (with a melting point of 6.0° C.), nanographite and bentonite in a mass ratio of 1:5:0.05.

The preparation method of the composite phase change material according to the above formulation was as follows:

(1) the PEG400 was accurately weighted, and mixed with ethanol (75 vol %) to prepare a PEG400 alcohol solution with a mass concentration of 5%;

(2) the nanographite was subjected to drying at 120° C. to remove impurities inside the material, such that the pretreated nanographite was obtained;

(3) the pretreated nanographite which was accurately weighed, and bentonite were added into the alcohol solution obtained in step (1) in a stirring state, after impregnation for 8 h, the mixture was subjected to drying at 80° C. for 8 h to obtain the composite phase change material.

A formulation of the hydrate promoter was as follows: the hydrate promoter was prepared from tetrabutylammonium bromide and leucine in a mass ratio of 2:1.

A method of producing a solid hydrate core was as follows: the reaction conditions were such that the reaction temperature was selected to be 278.65K, the reaction pressure was 8.0 MPa, and the solid hydrate promoter was added in an amount of 1.5% relative to the water in the system.

Upon testing, the induction time of hydrate formation was 0.25 min. The system pressure starting from the onset of the hydrate granules of the system to 30 min after the reaction was carried out was 4,825 kPa. Upon calculation, the gas storage amount of the solid state hydrate core was 165.3V/V. After 18.0 h, the gas recovery rate was 94.52%; the decomposition rate of hydrate was 5.48%.

Example 18

A coupling enhanced solid hydrate was prepared according to a method in Example 7, except that a preparation method of a solid state hydrate core was same as that in Example 17.

Upon testing, the induction time of hydrate formation was 0.25 min. The system pressure starting from the onset of the hydrate granules of the system to 30 min after the reaction was carried out was 4,825 kPa. Upon calculation, the gas storage amount of the solid state hydrate core was 165.3V/V. After 18.0 h, the gas recovery rate was 88.81%; the decomposition rate of hydrate was 11.19%.

Example 19

A coupling enhanced solid hydrate was prepared according to a method of Example 1, except that step (1-4) was replaced by the addition of 3.8 g of foam activated carbon, the foam activated carbon having a compressive strength of 2.0 MPa, a specific surface area of 750 $m^2/g$, a cell diameter of 120 μm and a density of 0.35 $g/m^3$.

Upon testing, the decomposition and release amount of the gas after 18 h was 5.85 mmol, the gas recovery rate was 93.67%; the decomposition rate of hydrate was only 6.33%.

Example 20

A coupling enhanced solid hydrate was prepared according to a method in Example 1, except that after step (1-4), the method further included a step (1-5), the step (1-5) was carried out by adding 3.8 g of foam activated carbon into the hydrate preparation system and blending for 5 min, the foam activated carbon having a compressive strength of 2.0 MPa, a specific surface area of 750 $m^2/g$, a cell diameter of 120 μm and a density of 0.35 $g/m^3$.

Upon testing, the decomposition and release amount of the gas after 18 h was 5.05 mmol, the gas recovery rate was 94.58%; the decomposition rate of hydrate was only 5.42%.

Comparative Example 1

The hydrate was prepared by using an initial aqueous system forming a solid state hydrate core of Example 1, except that only step (1-1) was carried out, steps (1-2) to (1-4) were not performed. The gas consumption in the autoclave of step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 25 mmol according to the changes in pressure from an atmospheric pressure to the last pressure in the autoclave, the gas recovery rate was 72.83%, and the decomposition rate of hydrate was 27.17%.

Comparative Example 2

A coupling enhanced solid hydrate was prepared by using a formulation and method described in Example 7, except that a dispersion liquid comprising a starch-based surfactant was merely supplemented with sodium carboxymethyl starch, which was dispersed in water according to a mass ratio 1:100 of sodium carboxymethyl starch to water to obtain 1 mL of the dispersion liquid comprising the starch-based surfactant. The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 17.37 mmol according to the changes in pressure from an atmospheric pressure to the last pressure in the autoclave, the gas recovery rate was 81.12%, and the decomposition rate of hydrate was 18.88%.

Comparative Example 3

A coupling enhanced solid hydrate was prepared by using a formulation and method described in Example 7, except that a dispersion liquid comprising a starch-based surfactant was merely supplemented with alkyl polyglycoside APG1214, which was dispersed in water according to a mass ratio 1:100 of alkyl polyglycoside APG1214 to water to obtain 1 mL of the dispersion liquid comprising the starch-based surfactant. The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 17.86 mmol according to the changes in pressure from an atmospheric pressure to the last pressure in the autoclave, the gas recovery rate was 80.58%, and the decomposition rate of hydrate was 19.42%.

Comparative Example 4

A coupling enhanced solid hydrate was prepared by using a formulation and method described in Example 7, except that a sodium carboxymethyl starch in a dispersion liquid comprising a starch-based surfactant was replaced by starch. The gas consumption in the autoclave in step (1-1) was 92 mmol.

The pressure in the reaction system was then rapidly reduced to an atmospheric pressure, and the vent valve was quickly shut off; the pressure changes in the autoclave were recorded in real time over 18.0 h of the continuous decomposition process, and the decomposition amount of the gas before the gas release process was 25.58 mmol according to the changes in pressure from an atmospheric pressure to the last pressure in the autoclave, the gas recovery rate was 72.19%, and the decomposition rate of hydrate was 27.81%.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A coupling enhanced solid hydrate, comprising a solid state hydrate core and a hydrate decomposition inhibition shell layer encapsulating the solid state hydrate core, wherein the hydrate decomposition inhibiting shell layer comprises a hydrate decomposition inhibiting composition, the solid state hydrate core comprises a hydrate forming agent, and the hydrate decomposition inhibiting composition comprises a starch-based surfactant that comprises a carboxymethyl starch salt and an alkyl glycoside surfactant.

2. The coupling enhanced solid hydrate of claim 1, wherein the starch-based surfactant in the hydrate decomposition inhibiting composition forms a hydrate protective layer.

3. The coupling enhanced solid hydrate of claim 2, wherein the hydrate decomposition inhibiting shell layer comprises in sequence from inside to outside: the hydrate protective layer, an adsorption-absorption protective layer formed of an adsorption-absorption agent, and an optional support material.

4. The coupling enhanced solid hydrate of claim 3, wherein the hydrate decomposition inhibiting shell layer further comprises an ice layer disposed over the adsorption-adsorption protective layer or disposed between the adsorption-absorption protective layer and the support material.

5. The coupling enhanced solid hydrate of claim 1, wherein the hydrate forming agent comprises a thermodynamic hydrate promoter and/or a kinetic hydrate promoter and optionally an auxiliary agent.

6. The coupling enhanced solid hydrate of claim 5, wherein the hydrate forming agent is a hydrate promotion composition comprising a composite phase change material;

wherein the hydrate promotion composition comprises a composite phase change material and a hydrate promoter;

wherein the composite phase change material comprises a phase change material, a porous matrix and a solid dispersant, the phase change material and the solid dispersant are loaded on the porous matrix;

wherein the hydrate promotion composition containing the composite phase change material has a mass content of the phase change material being 0.1%-50%, based on the total mass of the composite phase change material;

wherein a mass ratio of the phase change material, the porous matrix and the solid dispenser is 1:(1-10):(0.01-0.1);

wherein the phase change material is a glycol polymer containing one or more of C2-C4 alkyl groups;

wherein the porous matrix has a pore size of 1-10 nm, a specific surface area of 100-1,000 $m^2/g$, and the porous matrix is at least one selected from the group consisting of expanded graphite, nanographite, carbon nanotubes, graphene, ordered mesoporous molecular sieves, and a metal organic framework material;

wherein the solid dispersant is at least one selected from the group consisting of attapulgite, bentonite, and talc powder;

wherein the composite phase change material is prepared by a process comprising: dissolving and/or dispersing a phase change material in a solvent, and then contacting with a solid dispersant and a porous carrier, supporting the phase change material and the solid dispersant on the porous matrix, and subsequently removing the solvent;

wherein a mass ratio of the solvent to the phase change material is 1:0.01-0.5; the contact time is 2-10 h;

wherein a mass ratio of the hydrate promoter to the composite phase change material in the hydrate promotion composition comprising the composite phase change material is 1:(0.1-10);

wherein the hydrate promotion composition comprising the composite phase change material further includes an adjuvant; and a mass ratio of the hydrate promoter to the adjuvant is 1:(0.001-0.01); and wherein the adjuvant is selected from biosurfactants.

7. The coupling enhanced solid hydrate of claim 6, wherein the hydrate promoter in the hydrate promotion composition comprising the composite phase change material is one or more selected from a thermodynamic hydrate promoter and a kinetic hydrate promoter;

wherein the hydrate promoter is composed of the thermodynamic hydrate promoter and the kinetic hydrate promoter;

wherein a mass ratio of the thermodynamic hydrate promoter and the kinetic hydrate promoter is (3-4): 1;

wherein the thermodynamic hydrate promoter is at least one selected from the group consisting of methylcyclopentane, methylcyclohexane, tert-butyl methyl ether, tetrabutylammonium bromide, and tetrabutylammonium chloride; and wherein the kinetic hydrate promoter is at least one selected from amino acid kinetic hydrate promoter, leucine, histidine, tryptophan, arginine, and glutamic acid.

8. A method for improving solid hydrate storage and transportation stability comprising a hydrate production process, a hydrate storage and transportation process and a gas release process, wherein:

(1) the hydrate production process serves to prepare a solid state hydrate core by dispersing a hydrate forming agent in an aqueous phase to form an aqueous system, contacting a gas with the aqueous system in which the hydrate forming agent is dispersed under the hydrate formation conditions; then adding a dispersion liquid containing a starch-based surface active agent under the hydrate formation conditions to form an hydrate protective layer encapsulating the solid state hydrate core outside the solid state hydrate core to prepare a coupling enhanced solid hydrate;

wherein the starch-based surfactant comprises a carboxymethyl starch salt and an alkyl glycoside surfactant;

(2) the hydrate storage and transportation process serves to store and transport the coupling enhanced solid hydrate generated by the hydrate production process under the hydrate self-protection conditions; and (3) the gas release process serves to decompose the coupling enhanced solid hydrate after the hydrate storage and transportation process under the hydrate decomposition conditions, and release the gas therein.

9. The method of claim 8, wherein a mass ratio of the carboxymethyl starch salt to the alkyl glycoside surfactant is 1:1-3; and/or, a mass ratio of the starch-based surfactant to the dispersion liquid is 0.5-10:100; and/or, a volume ratio of the dispersion liquid containing the starch-based surfactant to an initial aqueous system forming the solid state hydrate core is not more than 15:100; and/or, the carboxymethyl starch salt is represented by a general structural formula of $[C_6H_7O_2(OH)_2OCH_2COOM]_n$, wherein M is at least one selected from the group consisting of an alkali metal element, an alkaline earth metal element and an ammonium radical; and/or, the carboxymethyl starch salt has a weight-average molecular weight of 3,000-150,000 and a substitution degree of carboxymethyl being 0.1-1; and/or, the alkyl glycoside surfactant is expressed by a general structural formula $RO(G)_n$, wherein R is a $C_8$-$C_{18}$ straight or branched chain alkyl group, G represents a saccharide unit, n represents the number of saccharide unit, wherein n is a positive integer from 1 to 3.

10. The method of claim 8, wherein the method further comprises: after forming the hydrate protective layer, adding an adsorption-absorption agent into the system under the conditions consisting of a temperature within an hydrate self-protective effect temperature range and a system pressure is 0.01-1 MPa higher than a phase equilibrium pressure of the hydrate at the temperature range, so as to form an adsorption-absorption protective layer encapsulating the hydrate protective layer outside the hydrate protective layer;

wherein the adsorption-absorption agent comprises a porous adsorbent material and a multi-carbon straight-chain alkane;

wherein a mass ratio of the porous adsorbent material and the multi-carbon straight-chain alkane is 0.5-10:100;

wherein the hydrate self-protective effect temperature range is 253.15K-272.15K;

wherein the hydrate phase equilibrium pressure within the hydrate self-protective effect temperature range is equal to the pressure calculated from the Chen-Guo hydrate phase equilibrium equation; and wherein a volume ratio of the adsorption-absorption agent to the initial aqueous system forming the solid state hydrate core is not more than 15:100.

11. The method of claim 10, wherein the method further comprises after forming the adsorption-absorption protective layer, forming an ice layer encapsulating the adsorption-absorption protective layer outside the adsorption-absorption protective layer; and the method further comprises after forming the ice layer, adding a support material comprising foam pores into the system, wherein the foam pores are distributed in the support material, and the support material has a compressive strength of 1-8 MPa, the foam pores have an average diameter of 50-200 μm, a specific surface area of 500-1,000 $m^2/g$ and a density of 0.05-0.4 $g/cm^3$;

wherein a mass ratio of the hydrate forming agent and the support material is 1:(10-500); and wherein the support material is at least one selected from the group consisting of foam activated carbon, foamed resin and foamed silicone rubber.

12. The method of claim 8, wherein a mode of producing the solid state hydrate core comprises: contacting a gas in an aqueous system with the hydrate forming agent under the hydrate formation conditions; and wherein the hydrate forming agent is selected from a hydrate promotion composition containing nanoparticle and/or a hydrate promotion composition containing a composite phase change material.

13. The coupling enhanced solid hydrate of claim 5, wherein the hydrate forming agent is a nanoparticle-containing hydrate promotion composition;

wherein the nanoparticle-containing hydrate promotion composition comprises a nanoparticle, a surfactant and a stabilizer, the surfactant at least comprises an amino acid amphoteric surfactant and an imidazoline-type surfactant;

wherein the nanoparticle is inorganic nanoparticle; and/or, the nanoparticle has an average particle diameter within a range of 5-500 nm;

wherein the surfactant is consisting of an amino acid amphoteric surfactant and an imidazoline-type surfactant; wherein a mass ratio of the amino acid amphoteric surfactant and the imidazoline-type surfactant in the surfactant is 1:0.1-10;

wherein the amino acid amphoteric surfactant is at least one selected from the group consisting of lauroyl glutamate and N-lauroyl sarcosinate;

wherein the imidazoline-type surfactant is at least one selected from the group consisting of 1-ethyl-3-methylimidazolium acetate and 1-ethyl-3-methylimidazolium triflate;

wherein the stabilizer is at least one selected from the group consisting of sodium 1-naphthalene sulphonate, sodium 2-amino-1-naphthalene sulphonate, sodium lignosulphonate and sodium cellulose sulphonate; and wherein the nanoparticle-containing hydrate promotion composition comprises the nanoparticle in an amount of 5-20 parts by weight, the surfactant in an amount of 1-5 parts by weight, and the stabilizer in an amount of 0.1-1 parts by weight.

14. The coupling enhanced solid hydrate of claim 1, wherein the coupling enhanced solid hydrate can be stored for 18 h under the conditions of a temperature of 268.15K and a pressure of 0-0.5 MPa and the decomposed gas is recovered, wherein the gas recovery rate is not less than 82%; and/or, the coupling enhanced solid hydrate can be stored for 18 h under the conditions of a temperature of 268.15K and a pressure of 0-0.5 MPa with a decomposition rate less than 15%.

15. The coupling enhanced solid hydrate of claim 1, wherein a mass ratio of the carboxymethyl starch salt and the alkyl glycoside surfactant is 1:1-3.

16. The coupling enhanced solid hydrate of claim 1, wherein the carboxymethyl starch salt is represented by a general structural formula of $[C_6H_7O_2(OH)_2OCH_2COOM]_n$, wherein M is at least one selected from the group consisting of an alkali metal element, an alkaline earth metal element and an ammonium radical; and/or, the carboxymethyl starch salt has a weight-average molecular weight of 3,000-150,000 and a substitution degree of carboxymethyl being 0.1-1; and/or, the alkyl glycoside surfactant is expressed by a general structural formula $RO(G)_n$, wherein R is a $C_8$-$C_{18}$ straight or branched chain alkyl group, G represents a saccharide unit, n represents the number of saccharide unit, wherein n is a positive integer from 1 to 3.

17. The coupling enhanced solid hydrate of claim 1, wherein the hydrate decomposition inhibiting composition further comprises an adsorption-absorption agent stored independently of the starch-based surfactant, wherein the adsorption-absorption agent comprises a porous adsorbent material and a multi-carbon straight-chain alkane; and/or, a mass ratio of the starch-based surfactant to the adsorption-absorption agent is 0.5-10:1.

18. The coupling enhanced solid hydrate of claim 17, wherein a mass ratio of the porous adsorbent material to the multi-carbon straight-chain alkane is 0.5-10:100; and/or, the porous adsorbent material is at least one selected from the group consisting of expanded graphite, nanographite, carbon nanotubes, graphene, ordered mesoporous molecular sieves and metal organic framework material; and/or, the multi-carbon straight-chain alkane is selected from straight-chain alkane containing 5-15 carbon atoms.

19. The coupling enhanced solid hydrate of claim 1, wherein the hydrate decomposition inhibiting composition further comprises a support material stored independently of the starch-based surfactant, the support material comprising a foam pore, wherein the foam pore is distributed in the support material, and the support material has a compressive strength of 1-8 MPa, an average diameter of the foam pore is 50-200 μm, a specific surface area of 500-1,000 $m^2/g$ and a density of 0.05-0.4 $g/cm^3$.

* * * * *